(12) United States Patent
Yasuda et al.

(10) Patent No.: US 11,990,629 B2
(45) Date of Patent: May 21, 2024

(54) CASING MATERIAL FOR POWER STORAGE DEVICE, PRODUCTION METHOD THEREFOR, AND POWER STORAGE DEVICE

(71) Applicant: DAI NIPPON PRINTING CO., LTD., Tokyo (JP)

(72) Inventors: Daisuke Yasuda, Tokyo (JP); Takanori Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 397 days.

(21) Appl. No.: 17/287,193

(22) PCT Filed: Oct. 24, 2019

(86) PCT No.: PCT/JP2019/041797
§ 371 (c)(1),
(2) Date: Apr. 21, 2021

(87) PCT Pub. No.: WO2020/085462
PCT Pub. Date: Apr. 30, 2020

(65) Prior Publication Data
US 2022/0013306 A1     Jan. 13, 2022

(30) Foreign Application Priority Data
Oct. 24, 2018   (JP) ................................ 2018-200441

(51) Int. Cl.
*H01M 50/124*   (2021.01)
*H01G 11/30*   (2013.01)
*H01G 11/82*   (2013.01)

(52) U.S. Cl.
CPC ........ *H01M 50/1243* (2021.01); *H01G 11/30* (2013.01); *H01G 11/82* (2013.01)

(58) Field of Classification Search
CPC ........................ H01M 50/124; H01M 50/1243
See application file for complete search history.

(56) References Cited

U.S. PATENT DOCUMENTS

2008/0286635 A1   11/2008   Seino et al.
2015/0372263 A1   12/2015   Douke et al.
(Continued)

FOREIGN PATENT DOCUMENTS

| CN | 107170915 A | * | 9/2017 | ........... B32B 15/088 |
| CN | 109585706 B | * | 12/2022 | ............. B32B 15/08 |
| EP | 3628717 B1 | * | 12/2021 | ........... B32B 15/095 |

(Continued)

OTHER PUBLICATIONS

Machine translation of WO 2015/072451 (no date).*
(Continued)

*Primary Examiner* — Amanda C. Walke
(74) *Attorney, Agent, or Firm* — Oliff PLC

(57) ABSTRACT

A casing material for a power storage device, including a laminate that includes, in order, at least a base material layer, a barrier layer, and a heat-fusible resin layer. The heat-fusible resin layer includes a single layer or a plurality of layers. A first heat-fusible resin layer, among the heat-fusible resin layers, that constitutes the surface of the laminate has a logarithmic decrement ΔE of no more than 0.20 in a rigid body pendulum measurement at 140° C.

31 Claims, 5 Drawing Sheets

(56) References Cited

U.S. PATENT DOCUMENTS

2018/0102514 A1    4/2018  Dai et al.
2021/0362473 A1*  11/2021  Yoshino ............ H01M 10/0525

FOREIGN PATENT DOCUMENTS

| EP | 3920258 A1 * | 12/2021 | ............ B32B 15/20 |
|----|---|---|---|
| JP | 2006-134692 A | 5/2006 | |
| JP | 2007-297427 A | 11/2007 | |
| JP | 2008-287971 A | 11/2008 | |
| JP | 2014-026778 A | 2/2014 | |
| JP | 2015-035325 A | 2/2015 | |
| JP | 2015035325 A * | 2/2015 | ............ B32B 15/08 |
| JP | 2017-004765 A | 1/2017 | |
| JP | 2019-117702 A | 7/2019 | |
| WO | WO-2015072451 A1 * | 5/2015 | .......... H01M 2/0277 |
| WO | 2018/066672 A1 | 4/2018 | |

OTHER PUBLICATIONS

Jun. 20, 2023 Office Action issued in Japanese Patent Application No. 2020-552611.
Jan. 28, 2020 International Search Report issued in International Patent Application No. PCT/JP2019/041797.
May 5, 2022 Office Action issued in Chinese Patent Application No. 201980070567.7.

* cited by examiner

CASING MATERIAL FOR POWER STORAGE DEVICE, PRODUCTION METHOD THEREFOR, AND POWER STORAGE DEVICE

TECHNICAL FIELD

The present disclosure relates to a power storage device outer packaging material, a method for producing the power storage device outer packaging material, and a power storage device.

BACKGROUND ART

Various types of power storage devices have been developed heretofore, and in every power storage device, an outer packaging material is an essential member for sealing power storage device elements such as an electrode and an electrolyte. Metallic outer packaging materials have been often used heretofore as power storage device outer packaging materials.

On the other hand, in recent years, power storage devices have been required to be diversified in shape and to be thinned and lightened with improvement of performance of electric cars, hybrid electric cars, personal computers, cameras, mobile phones and so on. However, metallic power storage device outer packaging materials that have often been heretofore used have the disadvantage that it is difficult to keep up with diversification in shape, and there is a limit on weight reduction.

Thus, in recent years, a film-shaped laminate with a base material layer, a barrier layer and a heat-sealable resin layer laminated in this order has been proposed as a power storage device outer packaging material which is easily processed into diversified shapes and is capable of achieving thickness reduction and weight reduction (see, for example, Patent Document 1).

In such a power storage device outer packaging material, generally, a concave portion is formed by cold molding, power storage device elements such as an electrode and an electrolytic solution are disposed in a space formed by the concave portion, and heat-sealable resin layers are heat-sealed to obtain a power storage device with power storage device elements stored in the power storage device outer packaging material.

PRIOR ART DOCUMENT

Patent Document

Patent Document 1: Japanese Patent Laid-open Publication No. 2008-287971

SUMMARY OF THE INVENTION

Problems to be Solved by the Invention

When a power storage device element is sealed, a heat-sealable resin layer is heat-sealed by applying a high temperature and a high pressure to a power storage device outer packaging material. However, studies conducted by the inventors of the present disclosure have shown that application of a high temperature and a high pressure to the power storage device outer packaging material crushes the heat-sealable resin layer located on the surface, so that the insulation quality of the power storage device outer packaging material is deteriorated.

Under these circumstances, a main object of the present invention is to provide a power storage device outer packaging material which includes a laminate including at least a base material layer, a barrier layer and a heat-sealable resin layer in this order and in which crushing in heat-sealing of the heat-sealable resin layer is effectively suppressed.

Means for Solving the Problem

The inventors of the present disclosure have extensively conducted studies for solving the above-mentioned problems. As a result, it has been found that in a power storage device outer packaging material which includes a laminate including at least a base material layer, a barrier layer and a heat-sealable resin layer in this order, in which the heat-sealable resin layer includes a single layer or multiple layers, and a first heat-sealable resin layer of the heat-sealable resin layer, which forms a surface of the laminate, has a logarithmic decrement $\Delta E$ of 0.20 or less at 140° C. in a rigid pendulum measurement, crushing in heat-sealing of the heat-sealable resin layer is effectively suppressed.

The present disclosure has been completed by further conducting studies based on the above-mentioned findings. That is, the present disclosure provides an invention of an aspect as described below:

a power storage device outer packaging material which includes a laminate including at least a base material layer, a barrier layer and a heat-sealable resin layer in this order, in which the heat-sealable resin layer includes a single layer or multiple layers, and a first heat-sealable resin layer of the heat-sealable resin layer, which forms a surface of the laminate, has a logarithmic decrement $\Delta E$ of 0.20 or less at 140° C. in a rigid pendulum measurement.

Advantages of the Invention

According to the present disclosure, it is possible to provide a power storage device outer packaging material which includes a laminate including at least a base material layer, a barrier layer and a heat-sealable resin layer in this order and in which crushing in heat-sealing of the heat-sealable resin layer is effectively suppressed. For example, insulation quality can be expected to be improved by suppressing the crushing. According to the present disclosure, it is also possible to provide a method for producing the power storage device outer packaging material, and a power storage device.

EMBODIMENTS OF THE INVENTION

The power storage device outer packaging material of the present disclosure includes a laminate including at least a base material layer, a barrier layer and a heat-sealable resin layer in this order, in which the heat-sealable resin layer includes a single layer or multiple layers, and a first heat-sealable resin layer of the heat-sealable resin layer, which forms a surface of the laminate, has a logarithmic decrement ΔE of 0.20 or less at 140° C. in a rigid pendulum measurement. Such a configuration of the power storage device outer packaging material of the present disclosure effectively suppresses crushing in heat-sealing of the heat-sealable resin layer.

Hereinafter, the power storage device outer packaging material of the present disclosure will be described in detail. In this specification, a numerical range indicated by the term "A to B" means "A or more" and "B or less". For example, the expression of "2 to 15 mm" means 2 mm or more and 15 mm or less.

1. Laminated Structure of Power Storage Device Outer Packaging Material

Figure 1:
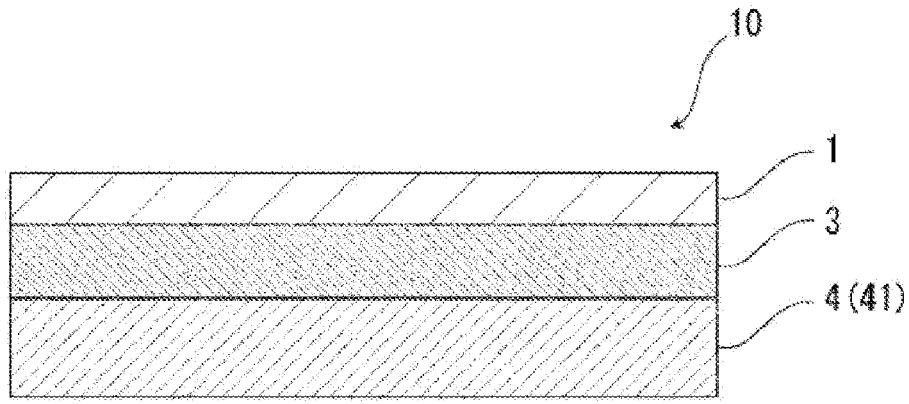
FIG. 1 is a schematic diagram showing an example of a cross-sectional structure of a power storage device outer packaging material of the present disclosure.
Figure 2:
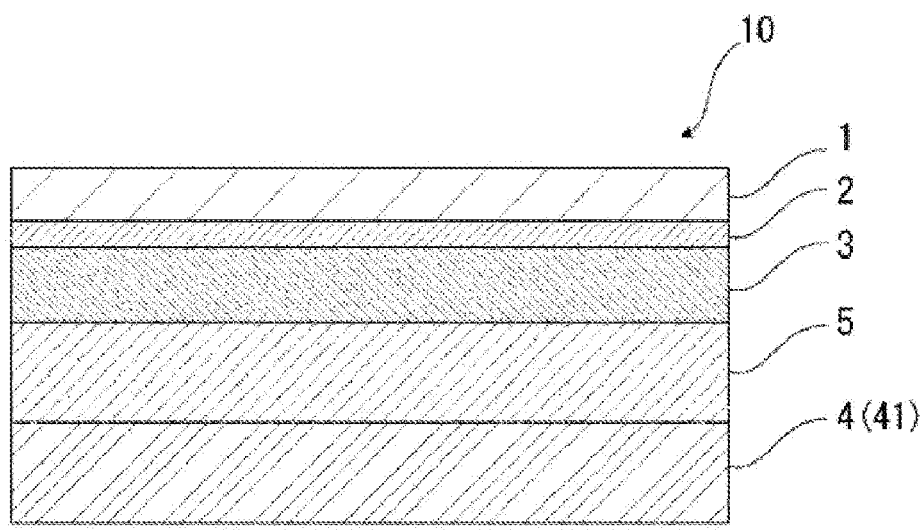
FIG. 2 is a schematic diagram showing an example of a cross-sectional structure of a power storage device outer packaging material of the present disclosure.
Figure 3:
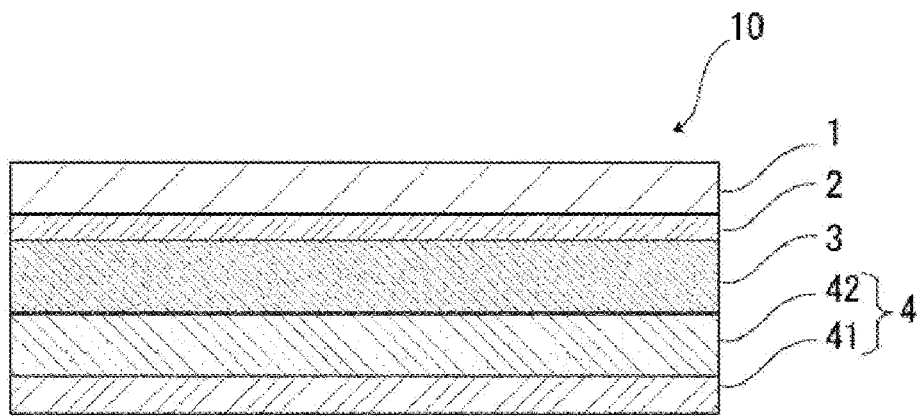
FIG. 3 is a schematic diagram showing an example of a cross-sectional structure of a power storage device outer packaging material of the present disclosure.
Figure 4:
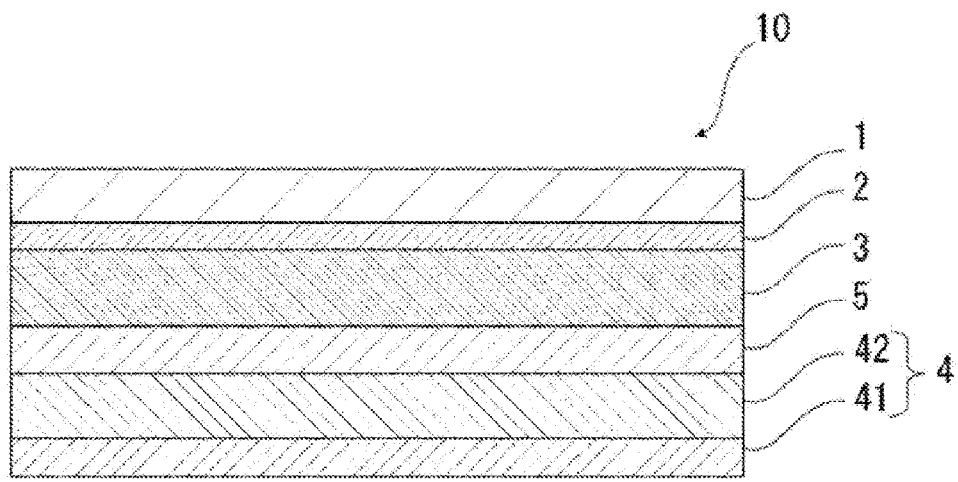
FIG. 4 is a schematic diagram showing an example of a cross-sectional structure of a power storage device outer packaging material of the present disclosure.
Figure 5:
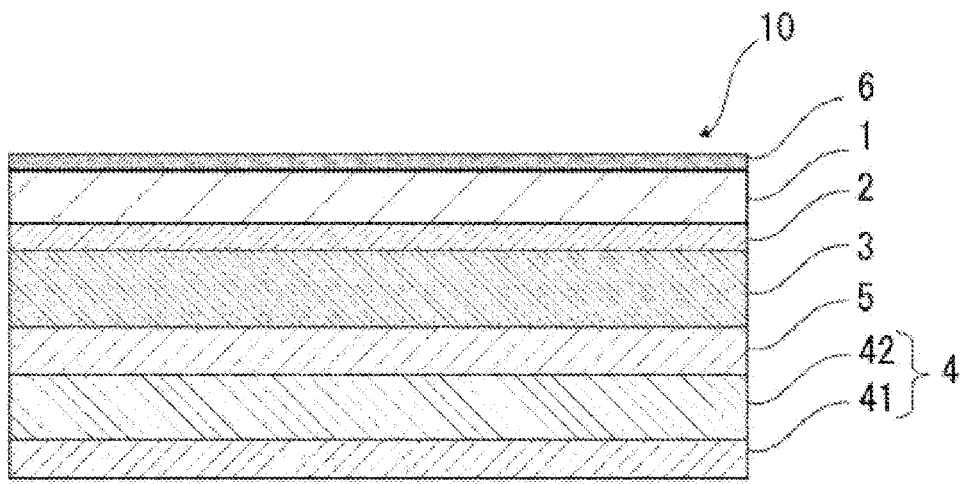
FIG. 5 is a schematic diagram showing an example of a cross-sectional structure of a power storage device outer packaging material of the present disclosure.

For example, as shown in, for example, FIG. 1 to FIG. 5, a power storage device outer packaging material 10 of the present disclosure includes a laminate including at least a base material layer 1, a barrier layer 3 and a heat-sealable resin layer 4 in this order. In the power storage device outer packaging material 10, the base material layer 1 is on the outermost layer side, and the heat-sealable resin layer 4 is on the inner layer side. In the power storage device outer packaging material 10 of the present disclosure, the heat-sealable resin layer 4 includes a single layer or multiple layers, and a first heat-sealable resin layer 41 of the heat-sealable resin layer 4 forms a surface of the laminate. FIG. 1 and FIG. 2 show a laminated configuration in which the heat-sealable resin layer 4 includes a single layer of the first heat-sealable resin layer 41, and the first heat-sealable resin layer 41 forms a surface of the laminate. In addition, FIG. 3 to FIG. 5 show a laminated configuration in which the heat-sealable resin layer 4 includes multiple layers (two layers) including the first heat-sealable resin layer 41 and a second heat-sealable resin layer 42, and the first heat-sealable resin layer 41 forms a surface of the laminate. As described later, the heat-sealable resin layer 4 may further include other heat-sealable resin layers such as a third heat-sealable resin layer and a fourth heat-sealable resin layer on the barrier layer 3 side of the second heat-sealable resin layer 42 in addition to the first heat-sealable resin layer 41 and the second heat-sealable resin layer 42.

In construction of the power storage device using the power storage device outer packaging material 10 and power storage device elements, the power storage device elements are put in a space formed by heat-sealing the peripheral portions of the first heat-sealable resin layers 41 of the power storage device outer packaging material 10 which face each other.

As shown in, for example, FIG. 2 to FIG. 5, the power storage device outer packaging material 10 may have an adhesive agent layer 2 between the base material layer 1 and the barrier layer 3 if necessary for the purpose of, for example, improving bondability between these layers. As shown in, for example, FIG. 2, FIG. 4 and FIG. 5, an adhesive layer 5 may be present between the barrier layer 3 and the heat-sealable resin layer 4 if necessary for the purpose of, for example, improving bondability between these layers. As shown in FIG. 5, a surface coating layer 6 or the like may be provided outside the base material layer 1 (on a side opposite to the heat-sealable resin layer 4 side).

The thickness of the laminate forming the power storage device outer packaging material 10 is not particularly limited, and is preferably about 180 μm or less or about 155 μm or less from the viewpoint of cost reduction, improvement of the energy density, and the like, and preferably about 35 μm or more, about 45 μm or more, or about 60 μm or more from the viewpoint of maintaining the function of the power storage device outer packaging material, which is protection of the power storage device elements. The thickness of the laminate is preferably in the range of, for example, about 35 to 180 μm, about 35 to 155 μm, about 45 to 180 μm, about 45 to 155 μm, about 60 to 180 μm, or about 60 to 155 μm.

2. Layers Forming Power Storage Device Outer Packaging Material

[Base Material Layer 1]

In the present disclosure, the base material layer 1 is a layer provided for the purpose of, for example, exhibiting a function as a base material of the power storage device outer packaging material. The base material layer 1 is located on the outer layer side of the power storage device outer packaging material.

The material that forms the base material layer 1 is not particularly limited as long as it has a function as a base material, i.e. at least insulation quality. The base material layer 1 can be formed using, for example, a resin, and the resin may contain additives described later.

When the base material layer 1 is formed of a resin, the base material layer 1 may be, for example, a resin film formed of a resin, or may be formed by applying a resin. The resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester resin include polyethylene terephthalate, polybutylene terephthalate, polyethylene naphthalate, polybutylene naphthalate, polyethylene isophthalate and copolyester. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polyamide MXD6 (polymethaxylylene adipamide); cycloaliphatic polyamides such as polyamide PACM6 (polybis(4-aminocyclohexyl)methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1.

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film. Since the polyester resin is hardly discolored even in the case where for example, an electrolytic solution is deposited on the surface, it is preferable that the polyester resin film is located at the outermost layer of the base material layer 1 when the base material layer 1 is a resin film laminate with two or more layers.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive layer. Here, the thickness of the adhesive is, for example, about 2 to 5 µm. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 µm.

Additives such as a lubricant, a flame retardant, an antiblocking agent, an antioxidant, a light stabilizer, a tackifier and an antistatic agent may be present on the surface of the base material layer 1 and/or inside the base material layer 1. The additives may be used alone, or may be used in combination of two or more thereof.

In the present disclosure, it is preferable that a lubricant is present on the surface of the base material layer 1 from the viewpoint of enhancing the moldability of the power storage device outer packaging material. The lubricant is not particularly limited, and is preferably an amide-based lubricant. Specific examples of the amide-based lubricant include saturated fatty acid amides, unsaturated fatty acid amides, substituted amides, methylol amides, saturated fatty acid bisamides, unsaturated fatty acid bisamides, fatty acid ester amides an aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide and N-stearyl erucic acid amide. Specific examples of the methylolamide include methyloistearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide and N,N'-dioleylsebacic acid amide. Specific examples of the fatty acid ester amide include stearoamideethyl stearate. Specific examples of the aromatic bisamide include m-xylylenebisstearic acid amide, m-xylylenebishydroxystearic acid amide and N,N'-distearylisophthalic acid amide. The lubricants may be used alone, or may be used in combination of two or more thereof.

When the lubricant is present on the surface of the base material layer 1, the amount of the lubricant present is not particularly limited, and is preferably about 3 mg/m$^2$ or more, more preferably about 4 to 15 mg/m$^2$, still more preferably about 5 to 14 mg/m$^2$.

The lubricant present on the surface of the base material layer 1 may be one obtained by exuding the lubricant contained in the resin forming the base material layer 1, or one obtained by applying the lubricant to the surface of the base material layer 1.

The thickness of the base material layer 1 is not particularly limited as long as a function as a base material is performed, and the thickness of the base material layer 1 is, for example, about 3 to 50 μm, preferably about 10 to 35 μm. When the base material layer 1 is a resin film laminate with two or more layers, the thickness of the resin film forming each layer is, for example, 2 to 35 μm, preferably about 2 to 25 μm.

[Adhesive Agent Layer 2]

In the power storage device outer packaging material of the present disclosure, the adhesive agent layer 2 is a layer provided between the base material layer 1 and the barrier layer 3 if necessary for the purpose of enhancing bondability between these layers.

The adhesive agent layer 2 is formed from an adhesive capable of bonding the base material layer 1 and the barrier layer 3. The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester resins such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a main agent containing a polyol compound and a curing agent containing an isocyanate compound. The polyurethane adhesive is preferably a two-liquid curable polyurethane adhesive having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound. Since the adhesive agent layer 2 is formed of a polyurethane adhesive, excellent electrolytic solution resistance is imparted to the power storage device outer packaging material, so that peeling of the base material layer 1 is suppressed even if the electrolytic solution is deposited on the side surface.

Other components may be added to the adhesive agent layer 2 as long as bondability is not inhibited, and the adhesive agent layer 2 may contain a colorant, a thermoplastic elastomer, a tackifier, a filler and the like. When the adhesive agent layer 2 contains a colorant, the power storage device outer packaging material can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinoneperylene-based pigments, isoindolenine-based pigments and benzimidazolone-based pigments. Examples of the inorganic pigment include carbon black-based pigments, titanium oxide-based pigments, cadmium-based pigments, lead-based pigments, chromium-based pigments and iron-based pigments, and also fine powder of mica (mica) and fish scale foil.

Of the colorants, carbon black is preferable for the purpose of, for example, blackening the appearance of the power storage device outer packaging material.

The average particle diameter of the pigment is not particularly limited, and is, for example, about 0.05 to 5 μm, preferably about 0.08 to 2 μm. The average particle size of the pigment is a median diameter measured by a laser diffraction/scattering particle size distribution measuring apparatus.

The content of the pigment in the adhesive agent layer 2 is not particularly limited as long as the power storage device outer packaging material is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and for example, the thickness is about 1 μm or more, or about 2 μm or more, and about 10 μm or less, or about 5 μm or less, and is preferably in the range of about 1 to 10 μm, about 1 to 5 μm, about 2 to 10 μm, or about 2 to 5 μm.

[Colored Layer]

The colored layer is a layer provided between the base material layer 1 and the barrier layer 3 if necessary (not shown). When the adhesive agent layer 2 is present, the colored layer may be provided between the base material layer 1 and the adhesive agent layer 2 or between the adhesive agent layer 2 and the barrier layer 3. The colored layer may be provided outside the base material layer 1. By providing the colored layer, the power storage device outer packaging material can be colored.

The colored layer can be formed by, for example, applying an ink containing a colorant to the surface of the base material layer 1, the surface of the adhesive agent layer 2, or the surface of the barrier layer 3. As the colorant, known colorants such as pigments and dyes can be used. The colorants may be used alone, or may be used in combination of two or more thereof.

Specific examples of the colorant contained in the colored layer include the same colorants as those described in the section [Adhesive agent Layer 2].

[Barrier Layer 3]

In the power storage device outer packaging material, the barrier layer 3 is a layer which suppresses at least ingress of moisture.

Examples of the barrier layer 3 include metal foils, deposited films and resin layers having a barrier property. Examples of the deposited film include metal deposited films, inorganic oxide deposited films and carbon-containing inorganic oxide deposited films, and examples of the resin layer include those of polyvinylidene chloride, fluorine-containing resins such as polymers containing chlorotrifluoroethylene (CTFE) as a main component, polymers containing tetrafluoroethylene (TFE) as a main component, polymers having a fluoroalkyl group, and polymers containing a fluoroalkyl unit as a main component, and ethylene vinyl alcohol copolymers. Examples of the barrier layer 3 include resin films provided with at least one of these deposited films and resin layers. A plurality of barrier layers 3 may be provided. Preferably, the barrier layer 3 contains a layer formed of a metal material. Specific examples of the metal material forming the barrier layer 3 include aluminum alloys, stainless steel, titanium steel and steel sheets. When the metal material is used as a metal foil, it is preferable that the metal material includes at least one of an aluminum alloy foil and a stainless steel foil.

The aluminum alloy is more preferably a soft aluminum alloy foil formed of, for example, an annealed aluminum alloy from the viewpoint of improving the moldability of the power storage device outer packaging material, and is preferably an aluminum alloy foil containing iron from the viewpoint of further improving the moldability. In the aluminum alloy foil containing iron (100 mass %), the content of iron is preferably 0.1 to 9.0 mass %, more preferably 0.5 to 2.0 mass %. When the content of iron is 0.1 mass % or more, it is possible to obtain a power storage device outer packaging material having more excellent moldability. When the content of iron is 9.0 mass % or less, it is possible to obtain a power storage device outer packaging material more excellent in flexibility. Examples of the soft aluminum alloy foil include aluminum alloy foils having a composition specified in JIS H4160: 1994 A8021H-O, JIS H4160: 1994 A8079H-O, JIS H4000: 2014 A8021P-O, or JIS H4000: 2014 A8079P-O. If necessary, silicon, magnesium, copper, manganese or the like may be added. Softening can be performed by annealing or the like.

Examples of the stainless steel foil include austenitic stainless steel foils, ferritic stainless steel foils, austenitic/ferritic stainless steel foils, martensitic stainless steel foils and precipitation-hardened stainless steel foils. From the viewpoint of providing a power storage device outer packaging material further excellent in moldability, it is preferable that the stainless steel foil is formed of austenitic stainless steel.

Specific examples of the austenite-based stainless steel foil include SUS 304 stainless steel, SUS 301 stainless steel and SUS 316L stainless steel, and of these, SUS 304 stainless steel is especially preferable.

When the barrier layer 3 is a metal foil, the barrier layer 3 may perform a function as a barrier layer suppressing at least ingress of moisture, and has a thickness of, for example, about 9 to 200 μm. For example, the thickness of the barrier layer 3 is preferably about 85 μm or less, more preferably about 50 μm or less, still more preferably about 40 μm or less, especially preferably about 35 μm or less, and preferably about 10 μm or more, more preferably about 20 μm or more, still more preferably about 25 μm or more. The thickness is preferably in the range of about 10 to 85 μm, about 10 to 50 μm, about 10 to 40 μm, about 10 to 35 μm, about 20 to 85 μm, about 20 to 50 μm, about 20 to 40 μm, about 20 to 35 μm, about 25 to 85 μm, about 25 to 50 μm, about 25 to 40 μm, or about 25 to 35 μm. When the barrier layer 3 is formed of an aluminum alloy foil, the thickness thereof is especially preferably in above-described range. Particularly, when the barrier layer 3 is formed of a stainless steel foil, the thickness of the stainless steel foil is preferably about 60 μm or less, more preferably about 50 μm or less, still more preferably about 40 μm or less, even more preferably about 30 μm or less, especially preferably about 25 μm or less, and preferably about 10 μm or more, more preferably about 15 μm or more. The thickness is about preferably in the range of about 10 to 60 μm, about 10 to 50 μm, about 10 to 40 μm, about 10 to 30 μm, about 10 to 25 μm, about 15 to 60 μm, about 15 to 50 μm, about 15 to 40 μm, about 15 to 30 μm, or about 15 to 25 μm.

When the barrier layer 3 is a metal foil, it is preferable that a corrosion-resistant film is provided at least on a surface on a side opposite to the base material layer for preventing dissolution and corrosion. The barrier layer 3 may include a corrosion-resistant film on each of both surfaces. Here, the corrosion-resistant film refers to a thin film obtained by subjecting the surface of the barrier layer to, for example, hydrothermal denaturation treatment such as boehmite treatment, chemical conversion treatment, anodization treatment, plating treatment with nickel, chromium or the like, or corrosion prevention treatment by applying a coating agent to impart corrosion resistance (e.g. acid resistance and alkali resistance) to the barrier layer. Specifically, the corrosion-resistant film means a film which improves the acid resistance of the barrier layer (acid-resistant film), a film which improves the alkali resistance of the barrier layer (alkali-resistant film), or the like. One of treatments for forming the corrosion-resistant film may be performed, or two or more thereof may be performed in combination. In addition, not only one layer but also multiple layers can be formed. Further, of these treatments, the hydrothermal denaturation treatment and the anodization treatment are treatments in which the surface of the metal foil is dissolved with a treatment agent to form a metal compound excellent in corrosion resistance. The definition of the chemical conversion treatment may include these treatments. When the barrier layer 3 is provided with the corrosion-resistant film, the barrier layer 3 is regarded as including the corrosion-resistant film.

The corrosion-resistant film exhibits the effects of preventing delamination between the barrier layer (e.g. an aluminum alloy foil) and the base material layer during molding of the power storage device outer packaging material; preventing dissolution and corrosion of the surface of the barrier layer, particularly dissolution and corrosion of aluminum oxide present on the surface of the barrier layer when the barrier layer is an aluminum alloy foil, by hydrogen fluoride generated by reaction of an electrolyte with moisture; improving the bondability (wettability) of the surface of the barrier layer; preventing delamination between the base material layer and the barrier layer during heat-sealing; and preventing delamination between the base material layer and the barrier layer during molding.

Various corrosion resistant films formed by chemical conversion treatment are known, and examples thereof include mainly corrosion resistant films containing at least one of a phosphate, a chromate, a fluoride, a triazine thiol compound and a rare earth oxide. Examples of the chemical conversion treatment using a phosphate or a chromate include chromic acid chromate treatment, phosphoric acid chromate treatment, phosphoric acid-chromate treatment and chromate treatment, and examples of the chromium compound used in these treatments include chromium nitrate, chromium fluoride, chromium sulfate, chromium acetate, chromium oxalate, chromium biphosphate, acetylacetate chromate, chromium chloride and chromium potassium sulfate. Examples of the phosphorus compound used in these treatments include sodium phosphate, potassium phosphate, ammonium phosphate and polyphosphoric acid. Examples of the chromate treatment include etching chromate treatment, electrolytic chromate treatment and coating-type chromate treatment, and coating-type chromate treatment is preferable. This coating-type chromate treatment is treatment in which at least a surface of the barrier layer (e.g. an aluminum alloy foil) on the inner layer side is first degreased by a well-known treatment method such as an alkali immersion method, an electrolytic cleaning method, an acid cleaning method, an electrolytic acid cleaning method or an acid activation method, and a treatment solution containing a metal phosphate such as Cr (chromium) phosphate, Ti (titanium) phosphate, Zr (zirconium) phosphate or Zn (zinc) phosphate or a mixture of these metal salts as a main component, a treatment solution containing any of non-metal salts of phosphoric acid and a mixture of these non-metal salts as a main component, or a treatment solution formed of a mixture of any of these salts and a synthetic resin or the like is then applied to the degreased surface by a well-known coating method such as a roll coating method, a gravure printing method or an immersion method, and dried. As the treatment liquid, for example, various solvents such as water, an alcohol-based solvent, a hydrocarbon-based solvent, a ketone-based solvent, an ester-based solvent, and an ether-based solvent can be used, and water is preferable. Examples of the resin component used here include polymers such as phenol-based resins and acryl-based resins, and examples of the treatment include chromate treatment using an aminated phenol polymer having any of repeating units represented by the following general formulae (1) to (4). In the aminated phenol polymer, the repeating units represented by the following general formulae (1) to (4) may be contained alone, or may be contained in combination of two or more thereof. The acryl-based resin is preferably polyacrylic acid, an acrylic acid-methacrylic acid ester copolymer, an acrylic acid-maleic acid copolymer, an acrylic acid-styrene copolymer, or a derivative thereof such as a sodium salt, an ammonium salt or an amine salt thereof. In particular, a derivative of polyacrylic acid such as an ammonium salt, a sodium salt or an amine salt of polyacrylic acid is preferable. In the present disclosure, the polyacrylic acid means a polymer of acrylic acid. The acryl-based resin is also preferably a copolymer of acrylic acid and dicarboxylic acid or dicarboxylic anhydride, and is also preferably an ammonium salt, a sodium salt or an amine salt of a copolymer of acrylic acid and dicarboxylic acid or dicarboxylic anhydride. The acryl-based resins may be used alone, or may be used in combination of two or more thereof.

[Chemical Formula 1]

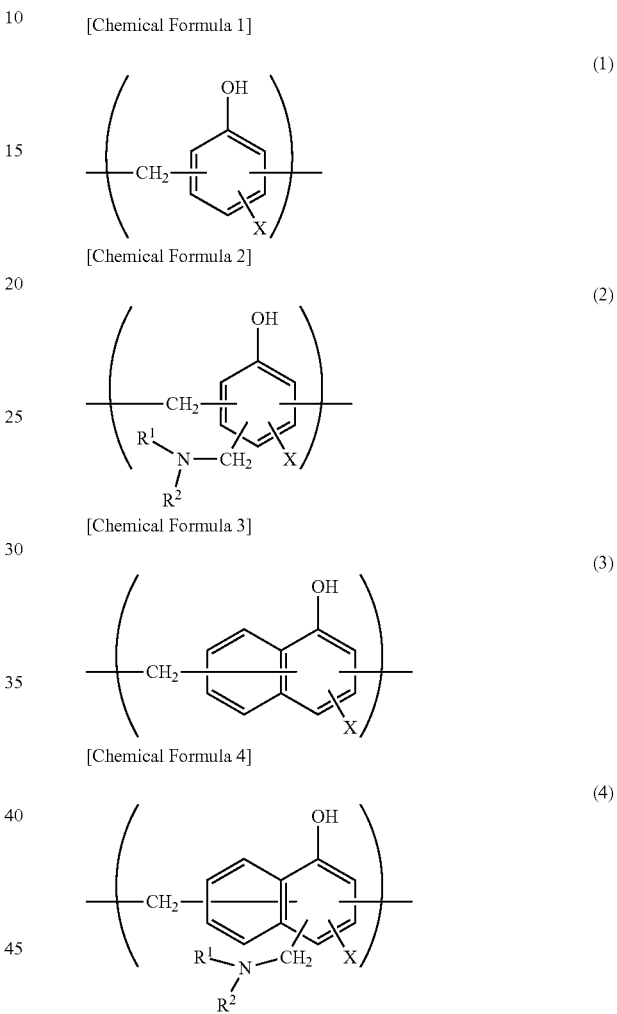

[Chemical Formula 2]

[Chemical Formula 3]

[Chemical Formula 4]

In the general formulae (1) to (4), X represents a hydrogen atom, a hydroxy group, an alkyl group, a hydroxyalkyl group, an allyl group or a benzyl group. $R^1$ and $R^2$ are the same or different, and each represents a hydroxy group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxy group or a hydroxyalkyl group. A number average molecular weight of the aminated phenol polymer having repeating units represented by the general formulae (1) to (4) is preferably 500 or more and 1,000,000 or less, and more preferably about 1,000 or more and 20,000 or less, for example. The aminated phenol polymer is produced by, for example, performing polycondensation of a phenol compound or a naphthol compound with formaldehyde to prepare a polymer including repeating units represented by the general formula (1) or the general formula (3), and then introducing a functional group ($—CH_2NR^1R^2$) into the obtained polymer using formaldehyde and an amine ($R^1R^2NH$). The aminated phenol polymers are used alone, or used in combination of two or more thereof.

Other examples of the corrosion-resistant film include thin films formed by corrosion prevention treatment of coating type in which a coating agent containing at least one selected from the group consisting of a rare earth element oxide sol, an anionic polymer and a cationic polymer is applied. The coating agent may further contain phosphoric acid or a phosphate, and a crosslinker for crosslinking the polymer. In the rare earth element oxide sol, fine particles of a rare earth element oxide (e.g. particles having an average particle diameter of 100 nm or less) are dispersed in a liquid dispersion medium. Examples of the rare earth element oxide include cerium oxide, yttrium oxide, neodymium oxide and lanthanum oxide, and cerium oxide is preferable from the viewpoint of further improving adhesion. The rare earth element oxides contained in the corrosion-resistant film can be used alone, or used in combination of two or more thereof. As the liquid dispersion medium for the rare earth element oxide, for example, various solvents such as water, an alcohol-based solvent, a hydrocarbon-based solvent, a ketone-based solvent, an ester-based solvent, and an ether-based solvent can be used, and water is preferable. For example, the cationic polymer is preferably polyethyleneimine, an ion polymer complex formed of a polymer having polyethyleneimine and a carboxylic acid, primary amine-grafted acrylic resins obtained by graft-polymerizing a primary amine with an acrylic main backbone, polyallylamine or a derivative thereof, or aminated phenol. The anionic polymer is preferably poly (meth)acrylic acid or a salt thereof, or a copolymer containing (meth)acrylic acid or a salt thereof as a main component. The crosslinker is preferably at least one selected from the group consisting of a silane coupling agent and a compound having any of functional groups including an isocyanate group, a glycidyl group, a carboxyl group and an oxazoline group. In addition, the phosphoric acid or phosphate is preferably condensed phosphoric acid or a condensed phosphate.

Examples of the corrosion-resistant film include films formed by applying a dispersion of fine particles of a metal oxide such as aluminum oxide, titanium oxide, cerium oxide or tin oxide or barium sulfate in phosphoric acid to the surface of the barrier layer and performing baking treatment at 150° C. or higher.

The corrosion resistance film may have a laminated structure in which at least one of a cationic polymer and an anionic polymer is further laminated if necessary. Examples of the cationic polymer and the anionic polymer include those described above.

The composition of the corrosion-resistant film can be analyzed by, for example, time-of-flight secondary ion mass spectrometry.

The amount of the corrosion-resistant film to be formed on the surface of the barrier layer 3 in the chemical conversion treatment is not particularly limited, but for example when the coating-type chromate treatment is performed, and it is desirable that the chromic acid compound be contained in an amount of, for example, about 0.5 to 50 mg, preferably about 1.0 mg to 40 mg, in terms of chromium, the phosphorus compound be contained in an amount of, for example, about 0.5 to 50 mg, preferably about 1.0 to 40 mg, in terms of phosphorus, and the aminated phenol polymer be contained in an amount of, for example, about 1.0 to 200 mg, preferably about 5.0 mg to 150 mg, per 1 $m^2$ of the surface of the barrier layer 3.

The thickness of the corrosion-resistant film is not particularly limited, and is preferably about 1 nm to 20 µm, more preferably about 1 nm to 100 nm, still more preferably about 1 nm to 50 nm from the viewpoint of the cohesive force of the film and the adhesive strength with the barrier layer and the heat-sealable resin layer. The thickness of the corrosion-resistant film can be measured by observation with a transmission electron microscope or a combination of observation with a transmission electron microscope and energy dispersive X-ray spectroscopy or electron beam energy loss spectroscopy. By analyzing the composition of the corrosion-resistant film using time-of-flight secondary ion mass spectrometry, peaks derived from secondary ions from, for example, Ce, P and O (e.g. at least one of $Ce_2PO_4^+$, $CePO_4^-$ and the like) and secondary ions from, for example, Cr, P and O (e.g. at least one of $CrPO_2^+$, $CrPO_4^-$ and the like) are detected.

The chemical conversion treatment is performed in the following manner: a solution containing a compound to be used for formation of a corrosion-resistant film is applied to the surface of the barrier layer by a bar coating method, a roll coating method, a gravure coating method, an immersion method or the like, and heating is then performed so that the temperature of the barrier layer is about 70 to 200° C. or less. The barrier layer may be subjected to a degreasing treatment by an alkali immersion method, an electrolytic cleaning method, an acid cleaning method, an electrolytic acid cleaning method or the like before the barrier layer is subjected to a chemical conversion treatment. When a degreasing treatment is performed as described above, the chemical conversion treatment of the surface of the barrier layer can be further efficiently performed. When an acid degreasing agent with a fluorine-containing compound dissolved in an inorganic acid is used for degreasing treatment, not only a metal foil degreasing effect can be obtained but also a metal fluoride can be formed, and in this case, only degreasing treatment may be performed.

[Heat-Sealable Resin Layer 4]

In the power storage device outer packaging material of the present disclosure, the heat-sealable resin layer 4 is a layer (sealant layer) which is located on the inner layer side and performs a function of hermetically sealing the power storage device element by heat-sealing the heat-sealable resin layer during construction of the power storage device. In the power storage device outer packaging material 10 of the present disclosure, the heat-sealable resin layer 4 includes a single layer or multiple layers, and a first heat-sealable resin layer 41 of the heat-sealable resin layer 4 forms a surface of the laminate. Therefore, during construction of the power storage device, the first heat-sealable resin layer 41 is heat-sealed to hermetically seal the power storage device element.

When the heat-sealable resin layer 4 includes a single layer, the heat-sealable resin layer 4 forms the first heat-sealable resin layer 41. FIG. 1 and FIG. 2 show a laminated configuration in which the heat-sealable resin layer 4 includes a single layer of the first heat-sealable resin layer 41, and the first heat-sealable resin layer 41 forms a surface of the laminate.

When the heat-sealable resin layer 4 includes multiple layers, at least the first heat-sealable resin layer 41 and the second heat-sealable resin layer 42 are provided in this order from the surface side of the laminate forming the power storage device outer packaging material 10. FIG. 3 to FIG. 5 show a laminated configuration in which the heat-sealable resin layer 4 includes multiple layers (two layers) including the first heat-sealable resin layer 41 and the second heat-sealable resin layer 42, and the first heat-sealable resin layer 41 forms a surface of the laminate.

When the heat-sealable resin layer 4 includes multiple layers, the heat-sealable resin layer 4 may further include a third heat-sealable resin layer, a fourth heat-sealable resin layer and the like on the barrier layer 3 side of the second heat-sealable resin layer 42 in addition to the first heat-sealable resin layer 41 and the second heat-sealable resin layer 42. When the heat-sealable resin layer 4 includes multiple layers, it is preferable that the heat-sealable resin layer 4 includes two layers including the first heat-sealable resin layer 41 and the second heat-sealable resin layer 42.

In the power storage device outer packaging material of the present disclosure, the logarithmic decrement ΔE of the first heat-sealable resin layer 41 at 140° C. in rigid pendulum measurement is 0.20 or less. In the present disclosure, the logarithmic decrement ΔE at 140° C. is 0.20 or less, so that crushing in heat-sealing of the first heat-sealable resin layer 41 is effectively suppressed.

Figure 11:
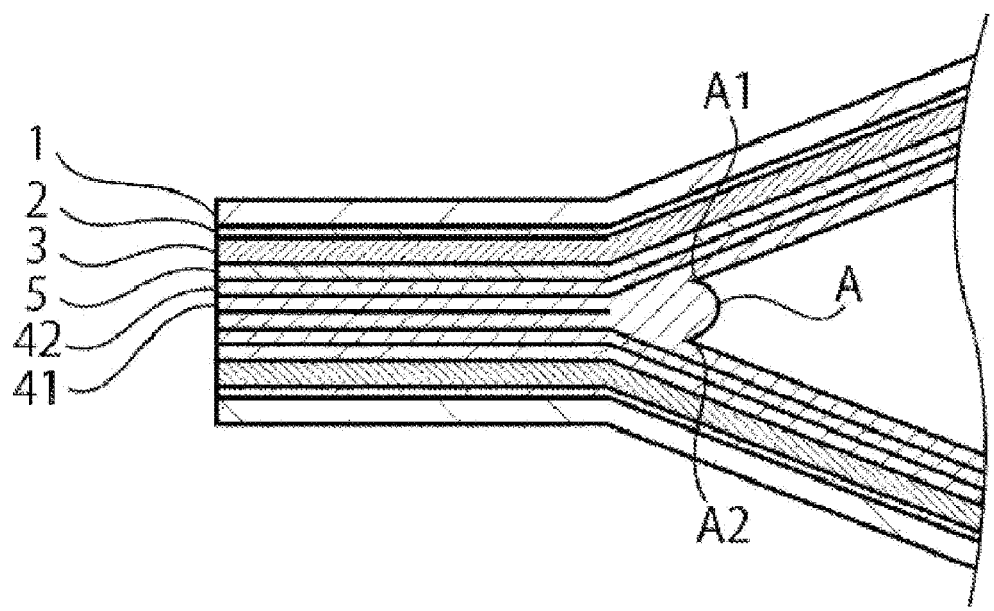
FIG. 11 is a schematic diagram for illustrating a protruding portion formed inside the heat-sealed portion of the heat-sealable resin layer.

The logarithmic decrement at 140° C. in rigid pendulum measurement is an index indicating the hardness of the resin in a high-temperature environment at 140° C. The smaller the logarithmic decrement, the higher the hardness of the resin. The temperature at which the heat-sealable resin layer is heat-sealed is high, and in a heat-sealed portion formed by heat-sealing the heat-sealable resin layer, the heat-sealable resin layer may protrude to a large extent to the inner side of the heat-sealed portion (the side of a space in which the power storage device element is stored). If the heat-sealable resin layer 4 protrudes to a large extent to the inner side of the heat-sealed portion, cracks are generated in the heat-sealable resin layer 4 with the protruding portion (a so-called polymer sump) as an origination point, so that insulation quality is easily deteriorated. FIG. 11 is a schematic sectional diagram in which a protruding portion A is formed on the inner side of the heat-sealed portion of the heat-sealable resin layer 4. As shown in the sectional diagram, end points A1 and A2 are present in the protruding portion A, and these end points A1 and A2 are likely to be origination points of cracks because of their structure. Therefore, if the heat-sealable resin layer 4 protrudes to a large extent to the inner side of the heat-sealed portion, so that a protruding portion is formed, deterioration of insulation quality by cracks easily occurs. Thus, it is important to control the shape of the heat-sealable part, and for this purpose, the hardness of the heat-sealable resin layer at a high temperature is important. Thus, in the present invention, a logarithmic decrement at a high temperature of 140° C. is adopted. In the rigid pendulum measurement, the attenuation rate of the pendulum at the time of increasing the resin temperature from a low temperature to a high temperature is measured. In the rigid pendulum measurement, generally, an edge portion is brought into contact with a surface of an object to be measured, and a pendulum motion is performed in a horizontal direction to apply vibrations to the object to be measured. In the power storage device outer packaging material of the present invention, the hard first heat-sealable resin layer 41 having a logarithmic decrement of 0.20 or less in a high-temperature environment at 140° C. is disposed on the surface of the power storage device outer packaging material to suppress crushing (thinning) of the first heat-sealable resin layer 41 during heat-sealing of the power storage device outer packaging material. Suppression of crushing of the first heat-sealable resin layer 41 inhibits the heat-sealable resin layer from protruding to a large extent to the inner side of the heat-sealable portion formed by heat-sealing the heat-sealable resin layer, so that deterioration of the insulation quality of the power storage device outer packaging material due to heat-sealing is effectively suppressed.

The logarithmic decrement ΔE is calculated in accordance with the following expression.

$$\Delta E = [\ln(A1/A2) + \ln(A2/A3) + \ldots \ln(An/An+1)]/n$$

A: amplitude
n: wavenumber

In the power storage device outer packaging material of the present invention, the logarithmic decrement ΔE at 140° C. is preferably about 0.10 or more, more preferably about 0.11 or more, still more preferably about 0.12 or more, and preferably about 0.18 or less, more preferably about 0.15 or less, still more preferably about 0.13 or less, and the logarithmic decrement ΔE at 140° C. is preferably in the range of about 0.10 to 0.20, about 0.10 to 0.18, about 0.10 to 0.15, about 0.10 to 0.13, about 0.11 to 0.20, about 0.11 to 0.18, about 0.11 to 0.15, about 0.11 to 0.13, about 0.12 to 0.20, about 0.12 to 0.18, about 0.12 to 0.15, or about 0.12 to 0.13, from the viewpoint of effectively suppressing crushing of the first heat-sealable resin layer 41 in heat-sealing of the first heat-sealable resin layer 41.

In the power storage device outer packaging material of the present invention, the logarithmic decrement ΔE of the first heat-sealable resin layer 41 at 80° C. in rigid pendulum measurement in the power storage device outer packaging material is preferably more than 0.08, more preferably about 0.09 or more, still more preferably about 0.10 or more, from the viewpoint of effectively suppressing crushing of the first heat-sealable resin layer 41 in heat-sealing of the first heat-sealable resin layer 41. In the power storage device outer packaging material of the present invention, the logarithmic decrement ΔE of the first heat-sealable resin layer 41 at 80° C. in rigid pendulum measurement is preferably about 0.20 or less, more preferably about 0.18 or less, still more preferably about 0.15 or less. The logarithmic decrement ΔE is preferably in the range of more than 0.08 and 0.20 or less, about more than 0.08 and 0.18 or less, about more than 0.08 and 0.15 or less, about 0.09 to 0.20, about 0.09 to 0.18 degrees, about 0.09 to 0.15, about 0.10 to 0.20, about 0.10 to 0.18 degrees, or about 0.10 to 0.15.

The logarithmic decrement ΔE of the first heat-sealable resin layer 41 at 80° C. in rigid pendulum measurement is measured in the same manner as the above-described method for measurement of the logarithmic decrement ΔE at 140° C. except that a logarithmic decrement ΔE of the first heat-sealable resin layer 41 having a surface temperature of 80° C. is adopted.

The logarithmic decrement ΔE of the first heat-sealable resin layer 41 can be adjusted by, for example, the melt mass flow rate (MFR), the molecular weight, the melting point, the softening point, the molecular weight distribution, the degree of crystallinity and the like of the resin forming the first heat-sealable resin layer 41.

In the measurement of the logarithmic decrement ΔE, a rigid pendulum physical property test is conducted on the first heat-sealable resin layer 41 with a commercially available rigid pendulum type physical property tester under the following conditions: a cylindrical cylinder edge is used as an edge portion to be pressed against the first heat-sealable resin layer 41, the initial amplitude is 0.3 degrees, and the temperature is elevated from 30° C. to 200° C. at a temperature elevation rate of 3° C./min. On the basis of the logarithmic decrement at 140° C., criteria for suppression of crushing which is exhibited by the first heat-sealable resin layer 41 as described later is determined. For the first heat-sealable resin layer 41 whose logarithmic decrement ΔE is measured, a sample obtained by immersing the power storage device outer packaging material in 15% hydrochloric acid to dissolve the base material layer and the barrier layer is sufficiently dried, and used as an object to be measured. When the power storage device outer packaging material includes the later-described adhesive layer 5, a laminate of the adhesive layer 5 and the heat-sealable resin layer 4 is used as a sample.

It is also possible to obtain the power storage device outer packaging material from the power storage device and measure the logarithmic decrement ΔE of the first heat-sealable resin layer 41. When the power storage device outer packaging material is obtained from the power storage device and the logarithmic decrement ΔE of the first heat-sealable resin layer 41 is measured, a sample is cut out from a top surface portion where the power storage device outer packaging material is not extended by molding, and the sample is used as an object to be measured.

In the outer power storage device outer packaging material of the present invention, the residual ratio of the total thickness of two first heat-sealable resin layers 41 after the heat-sealable resin layers of the laminate forming the power storage device outer packaging material are opposed to each other and heated and pressed in a laminating direction under the conditions of a temperature of 190° C., a surface pressure of 2.0 MPa and a time of 3 seconds is preferably about 30% or more, about 32% or more or about 34% or more, and is preferably in the range of 30 to 60%, 32 to 60%, 34 to 60%, 30 to 50%, 32 to 50%, or 34 to 50%. The upper limit of the residual ratio of the thickness is, for example, about 60% or about 50%. The residual ratio of the thickness is a value obtained by performing measurement in accordance with the following method. For setting the residual ratio of the thickness, for example, the type, composition, molecular weight and the like of the resin forming the first heat-sealable resin layer 41 are adjusted.

<Measurement of Residual Ratio of Thickness of First Heat-Sealable Resin Layer>

The power storage device outer packaging material is cut to 150 mm (length)×60 mm (width) to prepare a test sample. Next, the first heat-sealable resin layers 41 of the test sample are opposed to each other. Next, in this state, the test sample is heated and pressed from both sides in the lamination direction under the conditions of a temperature of 190° C., a surface pressure of 0.5 MPa, and a time of 3 seconds with the use of a 7 mm-wide metal plate to heat-seal the first heat-sealable resin layer 41. Next, the heat-sealed portion of the test sample is cut in the lamination direction using a microtome, and the total thickness of the two first heat-sealable resin layers 41 heat-sealed to each other is measured at the exposed cross-section. Similarly, the test sample before heat-sealing is cut in the lamination direction using a microtome, and the thickness of the two first heat-sealable resin layers 41 is measured at the exposed cross section. The ratio of the total thickness of the two first heat-sealable resin layers 41 after heat-sealing to the total thickness of the two first heat-sealable resin layers 41 before heat-sealing is calculated, and the residual ratio (%) of the total thickness of the two first heat-sealable resin layers 41 is measured. The thicknesses of the two first heat-sealable resin layers 41 at the heat-sealed portion are measured at a position where the thickness of the power storage device outer packaging material is constant.

It is also possible to obtain the power storage device outer packaging material from the power storage device and measure the residual ratio of the total thickness of the two first heat-sealable resin layers 41. When the power storage device outer packaging material is obtained from the power storage device and the residual ratio of the total thickness of the two first heat-sealable resin layer 41 is measured, a sample is cut out from a top surface portion where the power storage device outer packaging material is not extended by molding, and the sample is used as an object to be measured.

The resin forming the first heat-sealable resin layer 41 is not particularly limited as long as it can be heat-sealed and the logarithmic decrement ΔE of the first heat-sealable resin layer 41 is 0.20 or less.

The resin forming the first heat-sealable resin layer 41 is preferably a resin containing a polyolefin backbone, such as a polyolefin or an acid-modified polyolefin. The first resin forming the heat-sealable resin layer 41 can be confirmed to contain a polyolefin backbone by an analysis method such as infrared spectroscopy or gas chromatography mass spectrometry. In addition, it is preferable that a peak derived from maleic anhydride is detected when the resin forming the first heat-sealable resin layer 41 is analyzed by infrared spectroscopy. For example, when a maleic anhydride-modified polyolefin is measured by infrared spectroscopy, peaks derived from maleic anhydride are detected near wave numbers of 1760 $cm^{-1}$ and 1780 $cm^{-1}$. When the first heat-sealable resin layer 41 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Specific examples of the polyolefin to be acid-modified include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Among them, polypropylene is preferable. The polyolefin resin in the case of a copolymer may be a block copolymer or a random copolymer. These polyolefin-based resins may be used alone, or may be used in combination of two or more thereof.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene; cyclic dienes such as cyclopentadiene, dicyclopentadiene, cyclohexadiene and norbornadiene. Among these polyolefins, cyclic alkenes are preferable, and norbornene is more preferable.

The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

The acid-modified polyolefin may be an acid-modified cyclic polyolefin. The acid-modified cyclic polyolefin is a polymer obtained by copolymerizing a part of monomers forming the cyclic polyolefin in place of an acid component, or block-polymerizing or graft-polymerizing an acid component with the cyclic polyolefin. The cyclic polyolefin to be modified with an acid is the same as described above. The acid component to be used for acid modification is the same as the acid component used for modification of the polyolefin.

Examples of preferred acid-modified polyolefins include polyolefins modified with a carboxylic acid or an anhydride thereof, polypropylene modified with a carboxylic acid or an anhydride thereof, maleic anhydride-modified polyolefins, and maleic anhydride-modified polypropylene.

The first heat-sealable resin layer 41 may be formed from one resin alone, or may be formed from a blend polymer obtained by combining two or more resins.

Preferably, the first heat-sealable resin layer 41 forming the surface contains a polyolefin. For example, in the power storage device outer packaging material 10 of the present disclosure, it is preferable that the first heat-sealable resin layer 41 forming the surface contains a polyolefin and the second heat-sealable resin layer 42 contains an acid-modified polyolefin when the heat-sealable resin layer 4 includes the first heat-sealable resin layer 41 and the second heat-sealable resin layer 42. When the power storage device outer packaging material 10 of the present disclosure contains the adhesive layer 5, it is preferable that the first heat-sealable resin layer 41 forming the surface contains a polyolefin and the adhesive layer 5 contains an acid-modified polyolefin. Preferably, the adhesive layer 5 contains an acid-modified polyolefin, the first heat-sealable resin layer contains a polyolefin, and the second heat-sealable resin layer contains a polyolefin. More preferably, the adhesive layer 5 contains an acid-modified polypropylene, the first heat-sealable resin layer contains polypropylene, and the second heat-sealable resin layer contains polypropylene.

The first heat-sealable resin layer 41 may contain a lubricant and the like if necessary. When the first heat-sealable resin layer 41 contains a lubricant, the moldability of the power storage device outer packaging material can be improved. The lubricant is not particularly limited, and a known lubricant can be used. The lubricants may be used alone, or may be used in combination of two or more thereof.

The lubricant is not particularly limited, and is preferably an amide-based lubricant. Specific examples of the lubricant include those exemplified for the base material layer 1. The lubricants may be used alone, or may be used in combination of two or more thereof.

When a lubricant is present on the surface of the first heat-sealable resin layer 41, the amount of the lubricant present is not particularly limited, and is preferably about 10 to 50 mg/m$^2$, more preferably about 15 to 40 mg/m$^2$ from the viewpoint of improving the moldability of the power storage device outer packaging material. When a lubricant is present on the surface of the first heat-sealable resin layer 41, the first heat-sealable resin layer 41 forms the surface of the power storage device outer packaging material 10 for an electric storage device together with the lubricant.

The lubricant present on the surface of the first heat-sealable resin layer 41 may be one obtained by exuding the lubricant contained in the resin forming the first heat-sealable resin layer 41, or one obtained by applying a lubricant to the surface of the first heat-sealable resin layer 41.

The thickness of the first heat-sealable resin layer 41 is not particularly limited as long as the heat-sealable resin layer exhibits a function of being heat-sealed to hermetically seal the power storage device element.

From the viewpoint of effectively suppressing crushing in heat-sealing of the first heat-sealable resin layer 41, the thickness of the first heat-sealable resin layer 41 is preferably about 100 μm or less, about 85 μm or less, or about 60 μm or less, and 5 μm or more, 10 μm or more, 20 μm or more, 30 μm or more, or 40 μm or more, and is preferably in the range of about 5 to 100 μm, about 5 to 85 μm, about 5 to 60 μm, about 10 to 100 μm, about 10 to 85 μm, about 10 to 60 μm, about 20 to 100 μm, about 20 to 85 μm, about 20 to 60 μm, about 30 to 100 μm, about 30 to 85 μm, about 30 to 60 μm, about 40 to 100 μm, about 40 to 85 μm, or about 40 to 60 μm.

Specifically, when the heat-sealable resin layer 4 includes a single layer of the first heat-sealable resin layer 41, the thickness of the first heat-sealable resin layer 41 is preferably about 100 μm or less, about 85 μm or less, about 60 μm or less, or about 25 μm or less, and 5 μm or more, 10 μm or more, 20 μm or more, 30 μm or more, or 40 μm or more, and is preferably in the range of about 5 to 100 μm, about 5 to 85 μm, about 5 to 60 μm, about 5 to 25 μm, about 10 to 100 μm, about 10 to 85 μm, about 10 to 60 μm, about 10 to 25 μm, about 20 to 100 μm, about 20 to 85 μm, about 20 to 60 μm, about 20 to 25 μm, about 30 to 100 μm, about 30 to 85 μm, about 30 to 60 μm, about 40 to 100 μm, about 40 to 85 μm, or about 40 to 60 μm, from the viewpoint of effectively suppressing crushing in heat-sealing of the first heat-sealable resin layer 41.

When the heat-sealable resin layer 4 includes the first heat-sealable resin layer 41 and the second heat-sealable resin layer 42, the thickness of the first heat-sealable resin layer 41 is preferably about 85 μm or less, about 60 μm or less, or about 25 μm or less, and 5 μm or more, 10 μm or more, 20 μm or more, 30 μm or more, or 40 μm or more, and is preferably in the range of about 5 to 85 μm, about 5 to 60 μm, about 5 to 25 μm, about 10 to 85 μm, about 10 to 60 μm, about 10 to 25 μm, about 20 to 85 μm, about 20 to 60 μm, about 20 to 25 μm, about 30 to 85 μm, about 30 to 60 μm, about 40 to 85 μm, or about 40 to 60 μm, from the viewpoint of effectively suppressing crushing in heat-sealing of the first heat-sealable resin layer 41 and improving the sealing property of the power storage device outer packaging material.

When the heat-sealable resin layer 4 includes the second heat-sealable resin layer 42, the resin forming the second heat-sealable resin layer 42 is preferably a resin containing a polyolefin backbone, such as a polyolefin or an acid-modified polyolefin. These resins are the same as the resins described for the first heat-sealable resin layer 41. The resin forming the second heat-sealable resin layer 42 can be confirmed to contain a polyolefin backbone by an analysis method such as infrared spectroscopy or gas chromatography mass spectrometry, and the analysis method is not particularly limited. In addition, it is preferable that a peak derived from maleic anhydride is detected when the resin forming the second heat-sealable resin layer 42 is analyzed by infrared spectroscopy. For example, when a maleic anhydride-modified polyolefin is measured by infrared spectroscopy, peaks derived from maleic anhydride are detected near wave numbers of 1760 cm$^{-1}$ and 1780 cm$^{-1}$. When the second heat-sealable resin layer 42 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Preferably, the second heat-sealable resin layer 42 contains a polyolefin. In particular, when the heat-sealable resin layer 4 includes the first heat-sealable resin layer 41 and the second heat-sealable resin layer 42, and includes the later-described adhesive layer 5, it is preferable that the second heat-sealable resin layer 42 contains polyolefin. As described above, in the power storage device outer packaging material 10 of the present disclosure, it is preferable that the first heat-sealable resin layer 41 forming the surface contains a polyolefin and the second heat-sealable resin layer 42 contains an acid-modified polyolefin when the heat-sealable resin layer 4 includes the first heat-sealable resin layer 41 and the second heat-sealable resin layer 42 and does not include the later-described adhesive layer 5.

The thickness of the second heat-sealable resin layer 42 is not particularly limited as long as the heat-sealable resin layer 4 exhibits a function of being heat-sealed to hermetically seal the power storage device element.

From the viewpoint of effectively suppressing crushing in heat-sealing of the first heat-sealable resin layer 41 and improving the sealing property of the power storage device outer packaging material, the thickness of the second heat-sealable resin layer 41 is preferably larger than the thickness of the first heat-sealable resin layer 42. As the first heat-sealable resin layer 41, a resin that easily flows at a high temperature is preferably used so as to give excellent heat-sealability. By providing such a thickness relationship, the first heat-sealable resin layer 41, which is a part forming the heat-sealable resin layer 4 and is formed of a resin that easily flows, can be thinned to improve the insulation quality of the power storage device outer packaging material. By appropriately adjusting the MFR, the melting point, the molecular weight and the like of the resin forming the first heat-sealable resin layer 41, a resin layer that easily flows at a high temperature can be formed as the first heat-sealable resin layer 41.

From the viewpoint of effectively suppressing crushing in heat-sealing of the first heat-sealable resin layer 41 and improving the sealing property of the power storage device outer packaging material, the thickness of the second heat-sealable resin layer 42 is preferably about 100 μm or less, about 85 μm or less, or about 60 μm or less, and 5 μm or more, 10 μm or more, 20 μm or more, 30 μm or more, or 40 μm or more, and is preferably in the range of about 5 to 100 μm, about 5 to 85 μm, about 5 to 60 μm, about 10 to 100 μm, about 10 to 85 μm, about 10 to 60 μm, about 20 to 100 μm, about 20 to 85 μm, about 20 to 60 μm, about 30 to 100 μm, about 30 to 85 μm, about 30 to 60 μm, about 40 to 100 μm, about 40 to 85 μm, or about 40 to 60 sm.

The heat-sealable resin layer 4 may further include other heat-sealable resin layers such as a third heat-sealable resin layer and a fourth heat-sealable resin layer on the barrier layer 3 side of the second heat-sealable resin layer 42 in addition to the first heat-sealable resin layer 41 and the second heat-sealable resin layer 42. Examples of other resins forming the heat-sealable resin layer include the same as the resins described for the first heat-sealable resin layer 41. The thickness of each of the other heat-sealable resin layers is, for example, the same thickness as the thickness described for the second heat-sealable resin layer 42.

The total thickness of the heat-sealable resin layer 4 is preferably about 100 μm or less, about 85 μm or less, or about 60 μm or less, and 5 μm or more, 10 μm or more, 20 μm or more, 30 μm or more, or 40 μm or more, and is preferably in the range of about 5 to 100 μm, about 5 to 85 μm, about 5 to 60 μm, about 10 to 100 μm, about 10 to 85 μm, about 10 to 60 μm, about 20 to 100 μm, about 20 to 85 μm, about 20 to 60 μm, about 30 to 100 μm, about 30 to 85 μm, about 30 to 60 μm, about 40 to 100 μm, about 40 to 85 μm, or about 40 to 60 sm.

[Adhesive Layer 5]

In the power storage device outer packaging material of the present disclosure, the adhesive layer 5 is a layer provided between the barrier layer 3 (or corrosion-resistant film) and the heat-sealable resin layer 4 if necessary for firmly bonding these layers to each other.

The adhesive layer 5 is formed from a resin capable of bonding the barrier layer 3 and the heat-sealable resin layer 4 to each other. The resin to be used for forming the adhesive layer 5 is, for example, the same as that of the adhesive exemplified for the adhesive agent layer 2. Preferably, the resin to be used for forming the adhesive layer 5 contains a polyolefin backbone. Examples thereof include the polyolefins and acid-modified polyolefins exemplified for the first heat-sealable resin layer 41 described above. The resin forming the adhesive layer 5 can be confirmed to contain a polyolefin backbone by an analysis method such as infrared spectroscopy or gas chromatography mass spectrometry, and the analysis method is not particularly limited. In addition, it is preferable that a peak derived from maleic anhydride is detected when the resin forming the adhesive layer 5 is analyzed by infrared spectroscopy. For example, when a maleic anhydride-modified polyolefin is measured by infrared spectroscopy, peaks derived from maleic anhydride are detected near wave numbers of 1760 cm$^{-1}$ and 1780 cm$^{-1}$. However, if the degree of acid modification is low, the peaks may be too small to be detected. In that case, the peaks can be analyzed by nuclear magnetic resonance spectroscopy.

The adhesive layer 5 can be formed from a thermoplastic resin or a cured product of a thermosetting resin. Preferably, the adhesive layer 5 is formed from a thermoplastic resin.

From the viewpoint of firmly bonding the barrier layer 3 and the heat-sealable resin layer 4 to each other, it is preferable that the adhesive layer 5 contains an acid-modified polyolefin. As the acid-modified polyolefin, polyolefins modified with a carboxylic acid or an anhydride thereof, polypropylene modified with a carboxylic acid or an anhydride thereof, maleic anhydride-modified polyolefins, and maleic anhydride-modified polypropylene is especially preferable.

Further, from the viewpoint of obtaining a power storage device outer packaging material excellent in shape stability after molding while decreasing the thickness of the power storage device outer packaging material, the adhesive layer 5 is more preferably a cured product of a resin composition containing an acid-modified polyolefin and a curing agent. Preferred examples of the acid-modified polyolefin include those described above.

It is preferable that the first heat-sealable resin layer 41 forming the surface contains a polyolefin and the adhesive layer 5 contains an acid-modified polyolefin when the power storage device outer packaging material 10 of the present disclosure contains the adhesive layer 5 as described above.

The adhesive layer 5 is preferably a cured product of a resin composition containing an acid-modified polyolefin and at least one selected from the group consisting of a compound having an isocyanate group, a compound having an oxazoline group, and a compound having an epoxy group, especially preferably a cured product of a resin composition containing an acid-modified polyolefin and at least one selected from the group consisting of a compound having an isocyanate group and a compound having an epoxy group. Preferably, the adhesive layer 5 preferably contains at least one selected from the group consisting of polyurethane, polyester and epoxy resin. More preferably, the adhesive layer 5 contains polyurethane and epoxy resin. As the polyester, for example, an amide ester resin is preferable. The amide ester resin is generally produced by reaction of a carboxyl group with an oxazoline group. The adhesive layer 5 is more preferably a cured product of a resin composition containing at least one of these resins and the acid-modified polyolefin. When an unreacted substance of a curing agent, such as a compound having an isocyanate group, a compound having an oxazoline group, or an epoxy resin remains in the adhesive layer 5, the presence of the unreacted substance can be confirmed by, for example, a method selected from infrared spectroscopy, Raman spectroscopy, time-of-flight secondary ion mass spectrometry (TOF-SIMS) and the like.

From the viewpoint of further improving adhesion between the barrier layer 3 and the adhesive layer 5, the adhesive layer 5 is preferably a cured product of a resin composition containing a curing agent having at least one selected from the group consisting of an oxygen atom, a heterocyclic ring, a C=N bond, and a C—O—C bond. Examples of the curing agent having a heterocyclic ring include curing agents having an oxazoline group, and curing agents having an epoxy group. Examples of the curing agent having a C=N bond include curing agents having an oxazoline group and curing agents having an isocyanate group. Examples of the curing agent having a C—O—C bond include curing agents having an oxazoline group, curing agents having an epoxy group, and polyurethane. Whether the adhesive layer 5 is a cured product of a resin composition containing any of these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

The compound having an isocyanate group is not particularly limited, and is preferably a polyfunctional isocyanate compound from the viewpoint of effectively improving adhesion between the barrier layer 3 and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers. Examples thereof include adduct forms, biuret forms, and isocyanurate forms.

The content of the compound having an isocyanate group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The compound having an oxazoline group is not particularly limited as long as it is a compound having an oxazoline backbone. Specific examples of the compound having an oxazoline group include compounds having a polystyrene main chain and compounds having an acrylic main chain. Examples of the commercially available product include EPOCROS series manufactured by Nippon Shokubai Co., Ltd.

The proportion of the compound having an oxazoline group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

Examples of the compound having an epoxy group include epoxy resins. The epoxy resin is not particularly limited as long as it is a resin capable of forming a crosslinked structure by epoxy groups existing in the molecule, and a known epoxy resin can be used. The weight average molecular weight of the epoxy resin is preferably about 50 to 2000, more preferably about 100 to 1000, still more preferably about 200 to 800. In the present invention, the weight average molecular weight of the epoxy resin is a value obtained by performing measurement by gel permeation chromatography (GPC) under the condition of using polystyrene as a standard sample.

Specific examples of the epoxy resin include glycidyl ether derivatives of trimethylolpropane, bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The proportion of the epoxy resin in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The polyurethane is not particularly limited, and a known polyurethane can be used. The adhesive layer 5 may be, for example, a cured product of two-liquid curable polyurethane.

The proportion of the polyurethane in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5 in an atmosphere including a component which induces corrosion of the barrier layer, such as an electrolytic solution.

When the adhesive layer 5 is a cured product of a resin composition containing at least one selected from the group consisting of a compound having an isocyanate group, a compound having an oxazoline group and an epoxy resin, and the acid-modified polyolefin, the acid-modified polyolefin functions as a main agent, and the compound having an isocyanate group, the compound having an oxazoline group, and the compound having an epoxy group each function as a curing agent.

From the viewpoint of effectively suppressing crushing in heat-sealing of the first heat-sealable resin layer 41 and improving the sealing property of the power storage device outer packaging material, the total thickness of the adhesive layer 5 and the heat-sealable resin layer 4 is preferably about 50 μm or more, more preferably about 60 μm or more, still more preferably about 70 μm or more, and preferably about 120 μm or less, more preferably 100 μm or less, and is preferably in the range of about 50 to 120 μm, about 50 to 100 μm, about 60 to 120 μm, about 60 to 100 μm, about 70 to 120 μm, or about 70 to 100 μm.

In addition, the preferred ratio of the thickness of the first heat-sealable resin layer 41 and the thickness of the second heat-sealable resin layer 42 is as follows. Where the thickness of the first heat-sealable resin layer 41 is 1.0, the thickness of the second heat-sealable resin layer 42 is preferably about 1.5 to 6.0, more preferably about 1.7 to 5.5, still more preferably about 2.0 to 5.0. In addition, the preferred ratio of the thickness of the adhesive layer 5, the thickness of the first heat-sealable resin layer 41 and the thickness of the second heat-sealable resin layer 42 is as follows. Where the thickness of the first heat-sealable resin layer 41 1.0, it is preferable that the thickness of the adhesive layer 5 is about 0.5 to 3.0 and the thickness of the second heat-sealable resin layer 42 is about 1.5 to 6.0, it is more preferable that the thickness of the adhesive layer 5 is about 0.7 to 2.3 and the thickness of the second heat-sealable resin layer 42 is about 1.7 to 5.5, and it is still more preferable that the thickness of the adhesive layer 5 is about 1.0 to 2.0 and the thickness of the second heat-sealable resin layer 42 is about 2.0 to 5.0.

A specific example of the preferred ratio of the thickness of the first heat-sealable resin layer 41 and the thickness of the second heat-sealable resin layer 42 is as follows. Where the thickness of the first heat-sealable resin layer 41 is 1.0, the thickness of the second heat-sealable resin layer 42 is, for example, 2.0, 2.7, 3.0, 4.0, 5.0 or 6.0. A preferred specific example of the thickness of the adhesive layer 5, the thickness of the first heat-sealable resin layer 41 and the thickness of the second heat-sealable resin layer 42 is as follows. Where the thickness of the first heat-sealable resin layer 41 is 1.0, the thickness of the adhesive layer 5 is 1.0 and the thickness of the second heat-sealable resin layer 42 is 2.0, the thickness of the adhesive layer 5 is 1.7 and the thickness of the second heat-sealable resin layer 42 is 2.7, the thickness of the adhesive layer 5 is 1.3 and the thickness of the second heat-sealable resin layer 42 is 3.0, and the thickness of the adhesive layer 5 is 2.0 and the thickness of the second heat-sealable resin layer 42 is 5.0.

From the viewpoint of effectively suppressing crushing in heat-sealing of the first heat-sealable resin layer 41 and improving the sealing property of the power storage device outer packaging material, the thickness of the adhesive layer 5 may be larger than the thickness of the first heat-sealable resin layer 41. For example, when the heat-sealable resin layer 4 includes a single layer of the first heat-sealable resin layer 41, and the adhesive layer 5 is provided between the barrier layer 3 and the first heat-sealable resin layer 41, the thickness of the adhesive layer 5 is preferably equal to or more than the thickness of the first heat-sealable resin layer 41. As the first heat-sealable resin layer 41, a resin that more easily flows at a higher temperature as compared to the adhesive layer 5 is preferably used so as to give excellent heat-sealability. By providing such a thickness relationship, the first heat-sealable resin layer 41, which is a part forming the heat-sealable resin layer 4 and is formed of a resin that easily flows, can be thinned to improve the insulation quality of the power storage device outer packaging material. By appropriately adjusting the MFR, the melting point, the molecular weight and the like of the resin forming the first heat-sealable resin layer 41, a resin layer that easily flows at a high temperature can be formed as the first heat-sealable resin layer 41.

In the power storage device outer packaging material 10, the thickness of the second heat-sealable resin layer 42 is preferably equal to or more than the thickness of the adhesive layer 5 when the heat-sealable resin layer 4 includes the first heat-sealable resin layer 41 and the second heat-sealable resin layer 42. Since the second heat-sealable resin layer 42 has a better moisture barrier property as compared to the adhesive layer 5 contributing to bonding, the moisture barrier property of the power storage device outer packaging material can be improved by providing such a thickness relationship.

From the viewpoint of exhibiting high insulation quality after heat-sealing of the heat-sealable resin layer, it is preferable that the thickness of the second heat-sealable resin layer 42 is larger than the thickness of the adhesive layer 5 and the thickness of the adhesive layer 5 is larger than the thickness of the first heat-sealable resin layer 41.

The thickness of the adhesive layer 5 is preferably about 60 μm or less, about 50 μm or less, about 40 μm or less, about 30 μm or less, about 20 μm or less, about 10 μm or less, about 8 μm or less, about 5 μm or less, or about 3 μm or less, and preferably about 0.1 μm or more, about 0.5 μm or more, about 5 μm or more, about 10 μm or more, or about 20 μm or more, and is preferably in the range of about 0.1 to 60 μm, about 0.1 to 50 μm, about 0.1 to 40 μm, about 0.1 to 30 μm, about 0.1 to 20 μm, about 0.1 μm to 10 μm, about 0.1 to 8 μm, about 0.1 to 5 μm, about 0.1 to 3 μm, about 0.5 to 60 μm, about 0.5 to 50 μm, about 0.5 to 40 μm, about 0.5 to 30 μm, about 0.5 to 20 μm, about 0.5 μm to 10 μm, about 0.5 to 8 μm, about 0.5 to 5 μm, about 0.5 to 3 μm, about 5 to 60 μm, about 5 to 50 μm, about 5 to 40 μm, about 5 to 30 μm, about 5 to 20 μm, about 5 μm to 10 μm, about 5 to 8 μm, about 10 to 60 μm, about 10 to 50 μm, about 10 to 40 μm, about 10 to 30 μm, or about 10 to 20 μm. More specifically, in the case of a cured product of the adhesive exemplified for the adhesive agent layer 2 or an acid-modified polyolefin and a curing agent, the thickness of the adhesive layer is preferably about 1 to 10 μm, more preferably 1 μm or more and less than 10 μm, still more preferably about 1 to 8 μm, even more preferably about 1 to 5 μm, even more preferably about 1 to 3 μm. When the resin exemplified for the first heat-sealable resin layer 41 is used, the thickness of the adhesive layer is preferably about 2 to 60 μm, about 2 to 50 μm, about 10 to 60 μm, about 10 to 50 μm, about 20 to 60 μm, or about 20 to 50 μm. When the adhesive layer 5 is a cured product of a resin composition containing the adhesive exemplified for the adhesive agent layer 2 or an acid-modified polyolefin and a curing agent, the adhesive layer 5 can be formed by, for example, applying the resin composition and curing the resin composition by heating or the like. When the resin exemplified for the first heat-sealable resin layer 41 is used, for example, extrusion molding of the heat-sealable resin layer 4 and the adhesive layer 5 can be performed.

In the power storage device outer packaging material 10 of the present disclosure, specific examples of the preferred laminated configuration on a side opposite to the base material layer 1 side from the barrier layer 3 include a laminated configuration in which the adhesive layer 5 having a thickness of about 20 to 60 μm and the first heat-sealable resin layer 41 having a thickness of 20 to 50 μm are laminated in this order from the barrier layer 3 side; a laminated configuration in which the adhesive layer 5 having a thickness of about 20 to 60 μm and the first heat-sealable resin layer 41 having a thickness of 20 to 40 μm are laminated in this order from the barrier layer 3 side; a laminated configuration in which the adhesive layer 5 having a thickness of about 5 to 30 μm, the second heat-sealable resin layer 42 having a thickness of about 30 to 80 μm and the first heat-sealable resin layer 41 having a thickness of about 5 to 25 μm are laminated in this order from the barrier layer 3 side; and a laminated configuration in which the adhesive layer 5 having a thickness of about 5 to 20 μm, the second heat-sealable resin layer 42 having a thickness of about 40 to 80 μm and the first heat-sealable resin layer 41 having a thickness of about 5 to 25 μm are laminated in this order from the barrier layer 3 side.

[Surface Coating Layer 6]

The power storage device outer packaging material of the present disclosure may include a surface coating layer 6 on the base material layer 1 (on a side opposite to the barrier layer 3 from the base material layer 1) if necessary for the purpose of improving at least one of designability, electrolytic solution resistance, scratch resistance, moldability and the like. The surface coating layer 6 is a layer located on the outermost layer side of the power storage device outer packaging material when the power storage device is constructed using the power storage device outer packaging material.

The surface coating layer 6 can be formed from, for example, a resin such as polyvinylidene chloride, polyester, polyurethane, acrylic resin or epoxy resin.

When the resin forming the surface coating layer 6 is a curable resin, the resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a main agent containing a polyol compound and a curing agent containing an isocyanate compound. The polyurethane is preferably two-liquid curable polyurethane having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound. Since the surface coating layer 6 is formed of polyurethane, excellent electrolytic solution resistance is imparted to the power storage device outer packaging material.

If necessary, the surface coating layer 6 may contain additives such as the lubricant, an anti-blocking agent, a matting agent, a flame retardant, an antioxidant, a tackifier and an anti-static agent on at least one of the surface and the inside of the surface coating layer 6 according to the functionality and the like to be imparted to the surface coating layer 6 and the surface thereof. The additives are in the form of, for example, fine particles having an average particle diameter of about 0.5 nm to 5 μm. The average particle diameter of the additives is a median diameter measured by a laser diffraction/scattering particle size distribution measuring apparatus.

The additives may be either inorganic substances or organic substances. The shape of the additive is not particularly limited, and examples thereof include a spherical shape, a fibrous shape, a plate shape, an amorphous shape and a scaly shape.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acryl, crosslinked styrene, crosslinked polyethylene, benzoguanamine, gold, aluminum, copper and nickel. The additives may be used alone, or may be used in combination of two or more thereof. Of these additives, silica, barium sulfate and titanium oxide are preferable from the viewpoint of dispersion stability, costs and so on. The surface of the additive may be subjected to various kinds of surface treatments such as insulation treatment and dispersibility enhancing treatment.

The method for forming the surface coating layer 6 is not particularly limited, and examples thereof include a method in which a resin for forming the surface coating layer 6 is applied. When the additive is added to the surface coating layer 6, a resin mixed with the additive may be applied.

The thickness of the surface covering layer 6 is not particularly limited as long as the above-mentioned function as the surface coating layer 6 is performed, and it is, for example, about 0.5 to 10 μm, preferably about 1 to 5 μm.

3. Method for Producing Power Storage Device Outer Packaging Material

The method for producing a power storage device outer packaging material is not particularly limited as long as a laminate is obtained in which the layers of the power storage device outer packaging material of the present invention are laminated. Examples thereof include a method including the step of laminating at least the base material layer 1, the barrier layer 3 and the heat-sealable resin layer 4 in this order. In the method for producing the power storage device outer packaging material 10 of the present disclosure, the heat-sealable resin layer 4 includes a single layer or multiple layers, and the first heat-sealable resin layer 41 forming the surface of the laminate in the heat-sealable resin layer 4 has a logarithmic decrement ΔE of 0.20 or less at 140° C. in rigid pendulum measurement. Details of the power storage device outer packaging material 10 of the present disclosure are as described above.

An example of the method for producing the power storage device outer packaging material of the present invention is as follows. First, a laminate including the base material layer 1, the adhesive agent layer 2 and the barrier layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the barrier layer 3, the surface of which is subjected to a chemical conversion treatment if necessary, using a coating method such as a gravure coating method or a roll coating method, and dried, the barrier layer 3 or the base material layer 1 is then laminated, and the adhesive agent layer 2 is cured.

Then, the heat-sealable resin layer 4 is laminated on the barrier layer 3 of the laminate A. When the heat-sealable resin layer 4 is laminated directly on the barrier layer 3, the heat-sealable resin layer 4 may be laminated onto the barrier layer 3 of the laminate A by a method such as a thermal lamination method or an extrusion lamination method. When the adhesive layer 5 is provided between the barrier layer 3 and the heat-sealable resin layer 4, mention is made of, for example, (1) a method in which the adhesive layer 5 and the heat-sealable resin layer 4 are extruded to be laminated on the barrier layer 3 of the laminate A (extrusion lamination method or tandem lamination method); (2) a method in which the adhesive layer 5 and the heat-sealable resin layer 4 are laminated to form a laminate separately, and the laminate is laminated on the barrier layer 3 of the laminate A by a thermal lamination method, or a method in which a laminate with the adhesive layer 5 laminated on the barrier layer 3 of the laminate A is formed, and laminated to the heat-sealable resin layer 4 by a thermal lamination method; (3) a method in which the melted adhesive layer 5 is poured between the barrier layer 3 of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination); and (4) an adhesive for forming the adhesive layer 5 is applied by solution coating and dried or baked to laminate the adhesive on the barrier layer 3 of the laminate A, and the heat-sealable resin layer 4 formed in a sheet shape in advance is laminated on the adhesive layer 5.

When the surface coating layer 6 is provided, the surface coating layer 6 is laminated on a surface of the base material layer 1 on a side opposite to the barrier layer 3. The surface covering layer 6 can be formed by, for example, coating a surface of the base material layer 1 with the resin that forms the surface coating layer 6. The order of the step of laminating the barrier layer 3 on a surface of the base material layer 1 and the step of laminating the surface coating layer 6 on a surface of the base material layer 1 is not particularly limited. For example, the surface coating layer 6 may be formed on a surface of the base material layer 1, followed by forming the barrier layer 3 on a surface of the base material layer 1 on a side opposite to the surface coating layer 6.

As described above, a laminate including the surface coating layer 6 provided if necessary, the base material layer 1, the adhesive agent layer 2 provided if necessary, the barrier layer 3, the adhesive layer 5 provided if necessary, and the heat-sealable resin layer 4 in this order is formed, and the laminate may be further subjected to a heating treatment for strengthening the bondability of the adhesive agent layer 2 and the adhesive layer 5 provided if necessary.

In the power storage device outer packaging material, the layers forming the laminate may be subjected to surface activation treatment such as corona treatment, blast treatment, oxidation treatment or ozone treatment if necessary to improve processing suitability. For example, by subjecting a surface of the base material layer 1, which is opposite to the barrier layer 3, to a corona treatment, the ink printability of the surface of the base material layer 1 can be improved.

4. Uses of Power Storage Device Outer Packaging Material

The power storage device outer packaging material of the present disclosure is used as a packaging for hermetically sealing and storing power storage device elements such as a positive electrode, a negative electrode and an electrolyte. That is, in a packaging formed of the power storage device outer packaging material, a power storage device element including at least a positive electrode, a negative electrode and an electrolyte can be stored to obtain a battery.

Specifically, a power storage device element including at least a positive electrode, a negative electrode and an electrolyte is covered with the power storage device outer packaging material of the present disclosure such that a flange portion (region where a heat-sealable resin layer is in contact with itself) can be formed on the periphery of the power storage device element while a metal terminal connected to each of the positive electrode and the negative electrode protrudes to the outside, and the heat-sealable resin layer at the flange portion is heat-sealed with itself, thereby providing a power storage device using the power storage device outer packaging material. When the power storage device element is stored in the packaging formed of the power storage device outer packaging material of the present disclosure, the packaging is formed in such a manner that the heat-sealable resin portion of the power storage device outer packaging material of the present disclosure is on the inner side (a surface contacting the power storage device element).

The power storage device outer packaging material of the present disclosure can be suitably used for power storage devices such as batteries (including condensers, capacitors and the like). The power storage device outer packaging material of the present disclosure may be used for either primary batteries or secondary batteries, and is preferably used for secondary batteries. The type of a secondary battery to which the power storage device outer packaging material of the present disclosure is applied is not particularly limited, and examples thereof include lithium ion batteries, lithium ion polymer batteries, solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Of these secondary batteries, preferred subjects to which the power storage device outer packaging material of the present disclosure is applied include lithium ion batteries and lithium ion polymer batteries.

EXAMPLES

Hereinafter, the present disclosure will be described in detail by way of examples and comparative examples. However, the present disclosure is not limited to examples.
<Production of Power Storage Device Outer Packaging Material>

Example 1 and Comparative Example 1

A polyethylene terephthalate (PET) film (thickness: 12 µm) and a stretched nylon (ONy) film (thickness: 15 µm) were prepared as base material layers, and a two-liquid urethane adhesive (polyol compound and aromatic isocyanate-based compound) was applied to the PET film (3 µm) to bond the PET film to the ONy film. In addition, an aluminum foil (JIS H4160: 1994A 8021 H-O (thickness: 40 µm)) was prepared as a barrier layer. Next, a two-liquid urethane adhesive (polyol compound and aromatic isocyanate-based compound) was applied to one surface of the aluminum foil, so that an adhesive agent layer (thickness: 3 µm) was formed on the barrier layer. The adhesive agent layer on the barrier layer and the base material layer (ONy film side) were then laminated by a dry lamination method, and aging treatment was then performed to prepare a laminate of base material layer/adhesive agent layer/barrier layer. Both surfaces of the aluminum foil are subjected to chemical conversion treatment. The chemical conversion treatment of the aluminum foil was performed by applying to both the surfaces of the aluminum foil a treatment liquid including a phenol resin, a chromium fluoride compound and phosphoric acid using a roll coating method in such a manner that the application amount of chromium was 10 mg/m² (dry mass), and performing baking.

Next, maleic anhydride-modified polypropylene as an adhesive layer (thickness: 20 μm), random polypropylene as a second heat-sealable resin layer (thickness: 50 μm) and random polypropylene as a first heat-sealable resin layer (thickness: 10 μm) were co-extruded onto the barrier layer of each of the obtained laminates to laminate the adhesive layer, the second heat-sealable resin layer and the first heat-sealable resin layer on the barrier layer, thereby obtaining a power storage device outer packaging material in which a base material layer (thickness: 30 μm including an adhesive), an adhesive agent layer (3 μm), a barrier layer (40 μm), an adhesive layer (20 μm), a second heat-sealable resin layer (50 μm) and a first heat-sealable resin layer (10 μm) were laminated in this order. The first heat-sealable resin layers in Example 1 and Comparative Example 1 have logarithmic decrements ΔE (values obtained by performing measurement using a rigid pendulum type physical property tester) at 140° C. as shown in Table 1.

Example 2 and Comparative Example 2

A polyethylene terephthalate (PET) film (thickness: 12 μm) and a stretched nylon (ONy) film (thickness: 15 μm) were prepared as base material layers, and a two-liquid urethane adhesive (polyol compound and aromatic isocyanate-based compound) was applied to the PET film (3 μm) to bond the PET film to the ONy film. In addition, an aluminum foil (JIS H4160: 1994A 8021 H-O (thickness: 40 μm)) was prepared as a barrier layer. Next, a two-liquid urethane adhesive (polyol compound and aromatic isocyanate-based compound) was applied to one surface of the aluminum foil, so that an adhesive agent layer (thickness: 3 μm) was formed on the barrier layer. The adhesive agent layer on the barrier layer and the base material layer (ONy film side) were then laminated by a dry lamination method, and aging treatment was then performed to prepare a laminate of base material layer/adhesive agent layer/barrier layer. Both surfaces of the aluminum foil are subjected to chemical conversion treatment. The chemical conversion treatment of the aluminum foil was performed by applying to both the surfaces of the aluminum foil a treatment liquid including a phenol resin, a chromium fluoride compound and phosphoric acid using a roll coating method in such a manner that the application amount of chromium was 10 mg/m² (dry mass), and performing baking.

Next, maleic anhydride-modified polypropylene as an adhesive layer (thickness: 40 μm) and random polypropylene as a first heat-sealable resin layer (thickness: 40 μm) were co-extruded onto the barrier layer of each of the obtained laminates to laminate the adhesive layer and the first heat-sealable resin layer on the barrier layer, thereby obtaining a power storage device outer packaging material in which a base material layer (thickness: 30 μm including an adhesive), an adhesive agent layer (3 μm), a barrier layer (40 μm), an adhesive layer (40 μm) and a first heat-sealable resin layer (40 μm) were laminated in this order. The first heat-sealable resin layers in Example 2 and Comparative Example 2 have logarithmic decrements ΔE (values obtained by performing measurement using a rigid pendulum type physical property tester) at 140° C. as shown in Table 1.

Example 3

Except that as a base material layer, a polyethylene terephthalate (PET) film (thickness: 25 μm) was used in place of the laminate of a polyethylene terephthalate (PET) film (thickness: 12 μm) and a stretched nylon (ONy) film (thickness: 15 μm), the same procedure as in Example 1 was carried out to obtain a power storage device outer packaging material in which a base material layer (thickness: 25 μm), an adhesive agent layer (3 μm), a barrier layer (40 μm), an adhesive layer (20 μm), a second heat-sealable resin layer (50 μm) and a first heat-sealable resin layer (10 μm) were laminated in this order.

Example 4

Except that as a base material layer, a stretched nylon (ONy) film (thickness: 25 μm) was used in place of the laminate of a polyethylene terephthalate (PET) film (thickness: 12 μm) and a stretched nylon (ONy) film (thickness: 15 μm), the same procedure as in Example 1 was carried out to obtain a power storage device outer packaging material in which a base material layer (thickness: 25 μm), an adhesive agent layer (3 μm), a barrier layer (40 μm), an adhesive layer (20 μm), a second heat-sealable resin layer (50 μm) and a first heat-sealable resin layer (10 μm) were laminated in this order.

<Measurement of Logarithmic Decrement ΔE of First Heat-Sealable Resin Layer>

Figure 6:
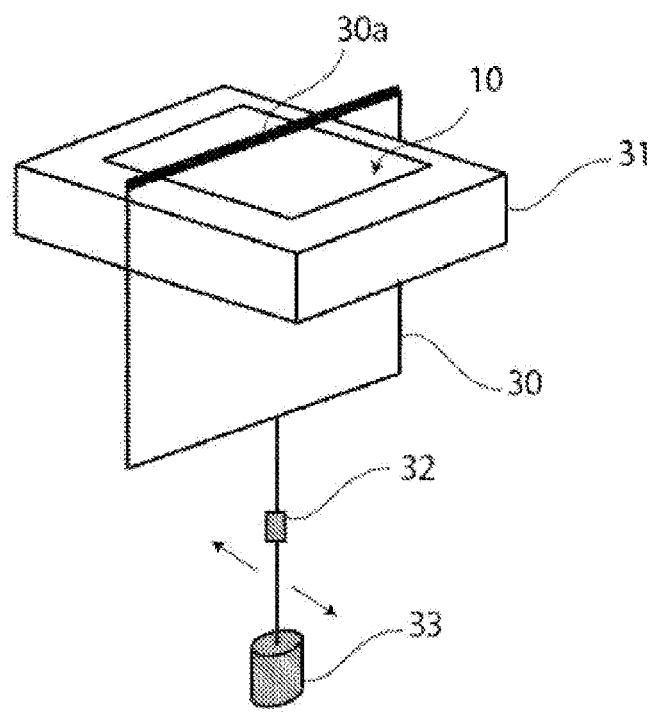
FIG. 6 is a schematic diagram for illustrating a method for measuring a logarithmic decrement ΔE in rigid pendulum measurement.

Each of the obtained power storage device outer packaging materials was cut into a rectangle having a width of 15 mm (TD: Transverse Direction) and a length of 45 mm (MD: Machine Direction) to obtain a test sample (power storage device outer packaging material 10). The MD of the power storage device outer packaging material corresponds to the rolling direction (RD) of the aluminum alloy foil, the TD of the power storage device outer packaging material corresponds to the TD of the aluminum alloy foil, and the rolling direction (RD) of the aluminum alloy foil can be determined by rolling streaks. If the MD of the power storage device outer packaging material cannot be identified by the rolling streaks of the aluminum alloy foil, the MD can be identified by the following method. As a method for identifying the MD of the power storage device outer packaging material, a cross-section of the heat-sealable resin layer of the power storage device outer packaging material is observed with an electron microscope to examine a sea-island structure, and a direction parallel to a cross-section having the largest average of diameters of island shapes in a direction perpendicular to the thickness direction of the heat-sealable resin layer can be determined as the MD. Specifically, a cross-section in the length direction of the heat-sealable resin layer and cross-sections (a total of 10 cross-sections) at angular intervals of 10 degrees from a direction parallel to the cross-section in the length direction to a direction perpendicular to the cross-section in the length direction are observed with an electron microscope photograph to examine sea-island structures. Next, in each cross section, the shape of each island is observed. For the shape of each island, the linear distance between the leftmost end in a direction perpendicular to the thickness direction of the heat-sealable resin layer and the rightmost end in the perpendicular direction is defined as a diameter y. In each cross-section, the average of the top 20 diameters y in descending order of the diameter y of the island shape is calculated. The direction parallel to a cross-section having the largest average of the diameters y of the island shapes is determined as MD. FIG. 6 is a schematic diagram for illustrating a method for measuring a logarithmic decrement ΔE by rigid pendulum measurement. A rigid pendulum type physical property tester (model: RPT-3000W manufactured by A&D Company, Limited) was used, FRB-100 was used for a frame of a pendulum 30, RBP-060 was used for a cylindrical cylinder edge 30a of an edge portion, CHB-100 was used for a cold block 31, a vibration displacement detector 32 and a weight 33 were used, and an initial amplitude was 0.3 degrees. The test sample was placed on the cold block 31 in such a manner that the measurement surface (first heat-sealable resin layer) of the test sample faced upward. The cylindrical cylinder edge 30a with the pendulum 30 was installed on the measurement surface in such a manner that the axial direction of the cylindrical cylinder edge 30a was orthogonal to the MD direction of the test sample. In addition, for preventing floating and warpage of the test sample during measurement, a tape was attached to the test sample at a position having no effect on measurement results, and fixed on the cold block 31. The cylindrical cylinder edge 30a was brought into contact with the surface of the first heat-sealable resin layer. Next, the logarithmic decrement ΔE of the first heat-sealable resin layer was measured in a temperature range from 30° C. to 200° C. at a temperature rise rate of 3° C./min using the cold block 31. A logarithmic decrement ΔE was adopted at which the surface temperature of the first heat-sealable resin layer of the test sample (power storage device outer packaging material 10) was 140° C. (An average of three measurements (N=3) made by using a unused cut sample rather than using a test sample once measured was used) For the first heat-sealable resin layer, each of the obtained power storage device outer packaging materials was immersed in 15% hydrochloric acid to dissolve the base material layer and the aluminum foil, the test sample including only the adhesive layer and the heat-sealable resin layer was sufficiently dried, and the logarithmic decrement ΔE was measured. Table 1 shows the logarithmic decrements ΔE at 140° C. The logarithmic decrement ΔE is calculated in accordance with the following expression.

$$\Delta E=[\ln(A1/A2)+\ln(A2/A3)+ \ldots +\ln(An/An+1)]/n$$

A: amplitude n: wavenumber

In addition, the logarithmic decrement ΔE at 80° C. was measured in the same manner as in <Measurement of logarithmic decrement ΔE of first heat-sealable resin layer> above except that the logarithmic decrement ΔE was adopted at which the surface temperature of the first heat-sealable resin layer was 80° C. Table 1 shows the results.

<Measurement of Residual Ratio of Thickness of First Heat-Sealable Resin Layer>

Each of the obtained power storage device outer packaging materials was cut to a length of 150 mm and a width of 60 mm to prepare a test sample (power storage device outer packaging material 10). Next, the first heat-sealable resin layers of the test sample prepared from the same power storage device outer packaging material were opposed to each other Next, in this state, the test sample was heated and pressed from both sides in the lamination direction under the conditions of a temperature of 190° C., a surface pressures (MPa) as shown in Table 1 and a time of 3 seconds with the use of a 7 mm-wide metal plate to heat-seal the first heat-sealable resin layer. Next, the heat-sealed portion of the test sample was cut in the lamination direction using a microtome, and the thickness of the two first heat-sealable resin layers heat-sealed to each other was measured at the exposed cross-section. Similarly, the test sample before heat-sealing was cut in the lamination direction using a microtome, and the thickness of the two first heat-sealable resin layers was measured at the exposed cross section. The ratio of the total thickness of the two first heat-sealable resin layers after heat-sealing to the total thickness of the two first heat-sealable resin layers before heat-sealing was calculated, and the residual ratio (%) of the total thickness of the two first heat-sealable resin layers was measured. Table 1 shows the results.

<Observation of Cross-Sectional Structure of Heat-Sealed Portion>

Figure 7:
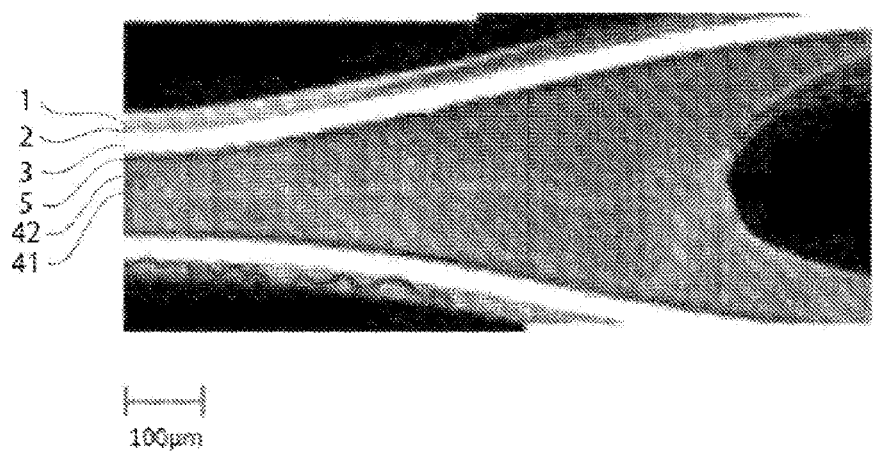
FIG. 7 is a micrograph of a cross-section of a heat-sealed portion between heat-sealable resin layers of the power storage device outer packaging material obtained in Example 1 (photographed at a magnification of 20 times).
Figure 8:
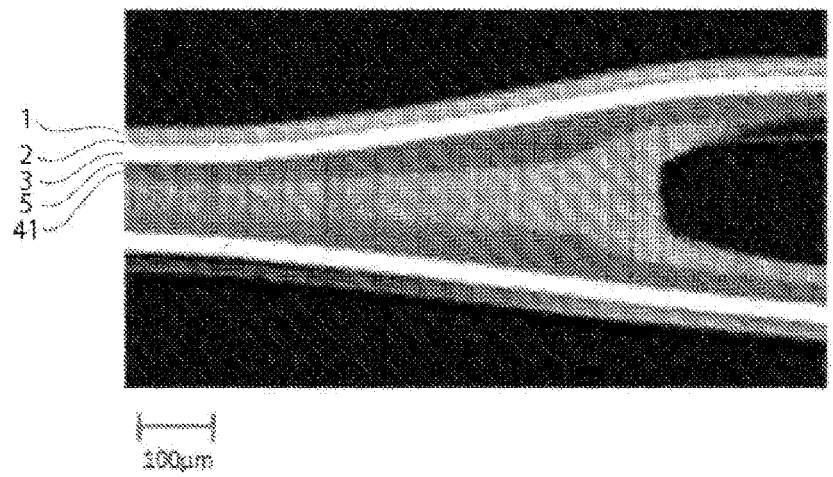
FIG. 8 is a micrograph of a cross-section of a heat-sealed portion between heat-sealable resin layers of the power storage device outer packaging material obtained in Example 2 (photographed at a magnification of 20 times).
Figure 9:
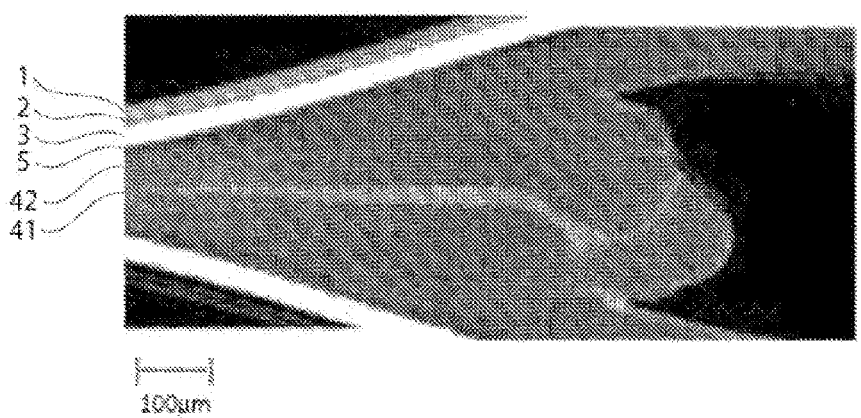
FIG. 9 is a micrograph of a cross-section of a heat-sealed portion between heat-sealable resin layers of the power storage device outer packaging material obtained in Comparative Example 1 (photographed at a magnification of 20 times).
Figure 10:
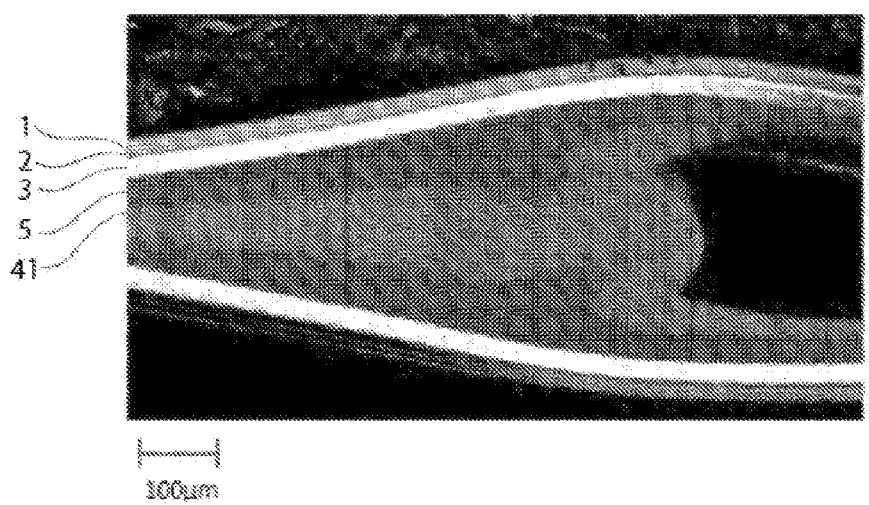
FIG. 10 is a micrograph of a cross-section of a heat-sealed portion between heat-sealable resin layers of the power storage device outer packaging material obtained in Comparative Example 2 (photographed at a magnification of 20 times).

Heat and pressure were applied to each of the power storage device outer packaging materials under conditions of a width of 7 mm, a temperature of 190° C., a pressure of 0.5 MPa and 3 seconds to heat-seal the heat-sealable resin layers, thereby forming the heat-sealed portion. Next, the heat-sealed portion was cut in the thickness direction using a microtome, and the obtained cross-section was observed with a microscope. As the microscope, VK-9710 manufactured by Keyence Corporation was used. For reference, micrographs of cross-sections in Examples 1 and 2 and Comparative Examples 1 and 2 are shown in FIG. 7 (Example 1), FIG. 8 (Example 2), FIG. 9 (Comparative Example 1) and FIG. 10 (Comparative Example 2), respectively. The micrographs of FIG. 7 to FIG. 10 show the positions of the base material layer 1, the adhesive agent layer 2, the barrier layer 3, the adhesive layer 5, the first heat-sealable resin layer 41 and the second heat-sealable resin layer 42.

In addition, on the basis of the micrographs, the cross-sectional structure of the heat-sealed portion was evaluated in accordance with the following criteria. Table 1 shows the results. The following criteria A and B suggest that crushing in heat-sealing of the first heat-sealable resin layer is effectively suppressed.

A: The heat-sealable resin layer does not protrude to the inner side (the side of a space in which the power storage device outer packaging material is stored) in the heat-sealed portion.

B: The heat-sealable resin layer slightly protrudes to the inner side (the side of a space in which the power storage device outer packaging material is stored) in the heat-sealed portion.

C: The heat-sealable resin layer protrudes to a large extent to the inner side (the side of a space in which the power storage device outer packaging material is stored) in the heat-sealed portion.

TABLE 1

| | Logarithmic decrement ΔE of first heat-sealable resin layer at 140° C. | Logarithmic decrement ΔE of first heat-sealable resin layer at 80° C. | Configuration of base material layer (μm) | Adhesive layer (μm) | Second heat-sealable resin first heat-layer/sealable resin layer (μm) |
|---|---|---|---|---|---|
| Examples 1 | 0.12 | 0.12 | PET(12)/DL(3)/ONy(15) | 20 | 50/10 |
| Examples 2 | 0.12 | 0.10 | PET(12)/DL(3)/ONy(15) | 40 | —/40 |
| Examples 3 | 0.13 | 0.12 | PET(25) | 20 | 50/10 |
| Examples 4 | 0.12 | 0.12 | ONy(25) | 20 | 50/10 |

TABLE 1-continued

| | | | | | |
|---|---|---|---|---|---|
| Comparative Examples 1 | 0.31 | 0.08 or less | PET(12)/DL(3)/ONy(15) | 20 | 50/10 |
| Comparative Examples 2 | 0.21 | 0.08 or less | PET(12)/DL(3)/ONy(15) | 40 | —/40 |

| | Residual ratio of total thickness of two first heat-sealable resin layers (%) | | | | Cross-sectional structure of heat-sealed portion |
|---|---|---|---|---|---|
| | Surface pressure 0.5 MPa | Surface pressure 1.0 MPa | Surface pressure 1.5 MPa | Surface pressure 2.0 MPa | |
| Examples 1 | 80 | 58 | 44 | 40 | A |
| Examples 2 | 71 | 53 | 40 | 34 | A |
| Examples 3 | 80 | 58 | 44 | 41 | A |
| Examples 4 | 79 | 58 | 43 | 40 | A |
| Comparative Examples 1 | 61 | 39 | 27 | 23 | C |
| Comparative Examples 2 | 60 | 38 | 26 | 21 | C |

In Table 1, DL denotes an adhesive bonding a polyethylene terephthalate film and a stretched nylon film to each other. In the second heat-sealable resin layer/first heat-sealable resin layer, the notation "-" indicates that the second heat-sealable resin layer is not provided.

The results shown in Table 1 reveals that in the power storage device outer packaging materials of Example 1 to 4, the logarithmic decrement ΔE at 140° C. of the first heat-sealable resin layer forming the surface is 0.20 or less, and thus the crushing in heat-sealing of the first heat-sealable resin layer is effectively suppressed.

As described above, the present disclosure provides the invention of aspects as shown below.

Item 1. A power storage device outer packaging material which includes a laminate including at least a base material layer, a barrier layer and a heat-sealable resin layer in this order, in which the heat-sealable resin layer includes a single layer or multiple layers, and a first heat-sealable resin layer of the heat-sealable resin layer, which forms a surface of the laminate, has a logarithmic decrement ΔE of 0.20 or less at 140° C. in a rigid pendulum measurement.

Item 2. The power storage device outer packaging material according to item 1, in which the thickness of the first heat-sealable resin layer is 5 μm or more and 25 μm or less.

Item 3. The power storage device outer packaging material according to item 1 or 2, in which after the first heat-sealable resin layers of the laminate are opposed to each other and heated and pressed in a laminating direction under conditions of a temperature of 190° C., a surface pressure of 2.0 MPa and a time of 3 seconds, the residual ratio of the total thickness of the two first heat-sealable resin layers opposed to each other is 30% or more.

Item 4. The power storage device outer packaging material according to any one of items 1 to 3, in which the resin forming the first heat-sealable resin layer contains a polyolefin backbone.

Item 5. The power storage device outer packaging material according to any one of items 1 to 4, further including an adhesive layer between the barrier layer and the heat-sealable resin layer.

Item 6. The power storage device outer packaging material according to item 5, in which the total thickness of the adhesive layer and the heat-sealable resin layer is 50 μm or more.

Item 7. The power storage device outer packaging material according to item 5 or 6, wherein the thickness of the adhesive layer is equal to or more than the thickness of the first heat-sealable resin layer.

Item 8. The power storage device outer packaging material according to any one of items 5 to 7, in which the heat-sealable resin layer includes the first heat-sealable resin layer and the second heat-sealable resin layer in this order from the surface side of the laminate, and the thickness of the second heat-sealable resin layer is equal to or more than the thickness of the adhesive layer.

Item 9. The power storage device outer packaging material according to any one of items 5 to 8, in which the thickness of the second heat-sealable resin layer is larger than the thickness of the first heat-sealable resin layer.

Item 10. The power storage device outer packaging material according to any one of items 5 to 9, in which the adhesive layer has a thickness of 50 μm or less.

Item 11. The power storage device outer packaging material according to any one of items 1 to 10, in which a lubricant is present on a surface of the first heat-sealable resin layer.

Item 12. A method for producing a power storage device outer packaging material, including the step of laminating at least a base material layer, a barrier layer and a heat-sealable resin layer in this order, in which the heat-sealable resin layer includes a single layer or multiple layers, and a first heat-sealable resin layer of the heat-sealable resin layer, which forms a surface of the laminate, has a logarithmic decrement ΔE of 0.20 or less at 140° C. in rigid pendulum measurement.

Item 13. A power storage device in which a power storage device element including at least a positive electrode, a negative electrode and an electrolyte is stored in a packaging formed of the power storage device outer packaging material according to any one of items 1 to 11.

DESCRIPTION OF REFERENCE SIGNS

1: Base material layer
2: Adhesive agent layer
3: Barrier layer
4: Heat-sealable resin layer
5: Adhesive layer
6: Surface coating layer
10: Power storage device outer packaging material
41: First heat-sealable resin layer
42: Second heat-sealable resin layer

The invention claimed is:

1. A power storage device outer packaging material which comprises a laminate including at least a base material layer, a barrier layer and a heat-sealable resin layer in this order, wherein the heat-sealable resin layer includes a single layer or multiple layers, and a first heat-sealable resin layer of the heat-sealable resin layer, which forms a surface of the laminate, has a logarithmic decrement ΔE of 0.20 or less at 140° C. in a rigid pendulum measurement.

2. The power storage device outer packaging material according to claim 1, wherein the thickness of the first heat-sealable resin layer is 5 μm or more and 25 μm or less.

3. The power storage device outer packaging material according to claim 1, wherein after the first heat-sealable resin layers of the laminate are opposed to each other and heated and pressed in a laminating direction under conditions of a temperature of 190° C., a surface pressure of 2.0 MPa and a time of 3 seconds, the residual ratio of the total thickness of the two first heat-sealable resin layers opposed to each other is 30% or more.

4. The power storage device outer packaging material according to claim 1, wherein the resin forming the first heat-sealable resin layer contains a polyolefin backbone.

5. The power storage device outer packaging material according to claim 1, further comprising an adhesive layer between the barrier layer and the heat-sealable resin layer.

6. The power storage device outer packaging material according to claim 5, wherein the total thickness of the adhesive layer and the heat-sealable resin layer is 50 μm or more.

7. The power storage device outer packaging material according to claim 5, wherein the thickness of the adhesive layer is equal to or more than the thickness of the first heat-sealable resin layer.

8. The power storage device outer packaging material according to claim 5, wherein the heat-sealable resin layer includes the first heat-sealable resin layer and the second heat-sealable resin layer in this order from the surface side of the laminate, and the thickness of the second heat-sealable resin layer is equal to or more than the thickness of the adhesive layer.

9. The power storage device outer packaging material according to claim 5, wherein the thickness of the second heat-sealable resin layer is larger than the thickness of the first heat-sealable resin layer.

10. The power storage device outer packaging material according to claim 5, wherein the adhesive layer has a thickness of 50 μm or less.

11. The power storage device outer packaging material according to claim 1, wherein a lubricant is present on a surface of the first heat-sealable resin layer.

12. The power storage device outer packaging material according to claim 1, wherein two or more lubricants are present on at least one of the surface and an inside of the first heat-sealable resin layer.

13. The power storage device outer packaging material according to claim 1, wherein two or more lubricants are present on at least one of the surface and an inside of the base material layer.

14. The power storage device outer packaging material according to claim 1, wherein the base material layer contains a polyester film and a polyamide film.

15. The power storage device outer packaging material according to claim 1, wherein the laminate has a thickness of 155 μm or less.

16. The power storage device outer packaging material according to claim 1, wherein the laminate has a thickness of more than 155 μm and 180 μm or less.

17. The power storage device outer packaging material according to claim 1, wherein the base material layer has a thickness of 35 μm or less.

18. The power storage device outer packaging material according to claim 1, wherein the base material layer has a thickness of more than 35 μm and 50 μm or less.

19. The power storage device outer packaging material according to claim 1, wherein the barrier layer has a thickness of 50 μm or less.

20. The power storage device outer packaging material according to claim 1, wherein the barrier layer has a thickness of more than 50 μm and 200 μm or less.

21. The power storage device outer packaging material according to claim 1, wherein the heat-sealable resin layer contains at least one selected from the group consisting of polyolefins, cyclic polyolefins, acid-modified polyolefins, and acid-modified cyclic polyolefins.

22. The power storage device outer packaging material according to claim 1, wherein the heat-sealable resin layer is formed from a blend polymer obtained by combining two or more resins.

23. The power storage device outer packaging material according to claim 1, wherein the power storage device outer packaging material is colored.

24. The power storage device outer packaging material according to claim 1, further comprising an adhesive agent layer between the base material layer and the barrier layer, wherein the adhesive agent layer contains a colorant.

25. The power storage device outer packaging material according to claim 1, further comprising a colored layer between the base material layer and the barrier layer.

26. A method for producing a power storage device outer packaging material, comprising the step of laminating at least a base material layer, a barrier layer and a heat-sealable resin layer in this order, wherein the heat-sealable resin layer includes a single layer or multiple layers, and a first heat-sealable resin layer of the heat-sealable resin layer, which forms a surface of the laminate, has a logarithmic decrement ΔE of 0.20 or less at 140° C. in rigid pendulum measurement.

27. The method according to claim 26, wherein an adhesive layer is provided between the barrier layer and the heat-sealable resin layer, and the adhesive layer and the heat-sealable resin layer are formed by a method in which the adhesive layer and the heat-sealable resin layer are laminated by co-extrusion.

28. The method according to claim 26, wherein an adhesive layer is provided between the barrier layer and the heat-sealable resin layer, and the adhesive layer and the heat-sealable resin layer are formed by a method in which a laminate of the adhesive layer and the heat-sealable resin layer is formed, and the laminate is laminated on the barrier layer by a thermal lamination method.

29. The method according to claim 26, wherein an adhesive layer is provided between the barrier layer and the heat-sealable resin layer, and the adhesive layer and the heat-sealable resin layer are formed by a method in which an adhesive for forming the adhesive layer is applied onto the barrier layer by an extrusion method or solution coating, and the heat-sealable resin layer formed in a sheet shape in advance is laminated on the adhesive layer by a thermal lamination method.

30. The method according to claim 26, wherein an adhesive layer is provided between the barrier layer and the heat-sealable resin layer, and the adhesive layer and the heat-sealable resin layer are formed by a method in which the adhesive layer that is melted is poured between the barrier layer and the heat-sealable resin layer formed in a sheet shape beforehand, and simultaneously the laminate and the heat-sealable resin layer are bonded together with the adhesive layer interposed therebetween.

31. A power storage device in which a power storage device element including at least a positive electrode, a negative electrode and an electrolyte is stored in a packaging formed of the power storage device outer packaging material according to claim 1.

\* \* \* \* \*